Nov. 2, 1965   A. T. KOEHLER   3,215,064
AUTOMATIC STRAPPING AND SEALING MACHINE
Filed May 25, 1964   17 Sheets-Sheet 1
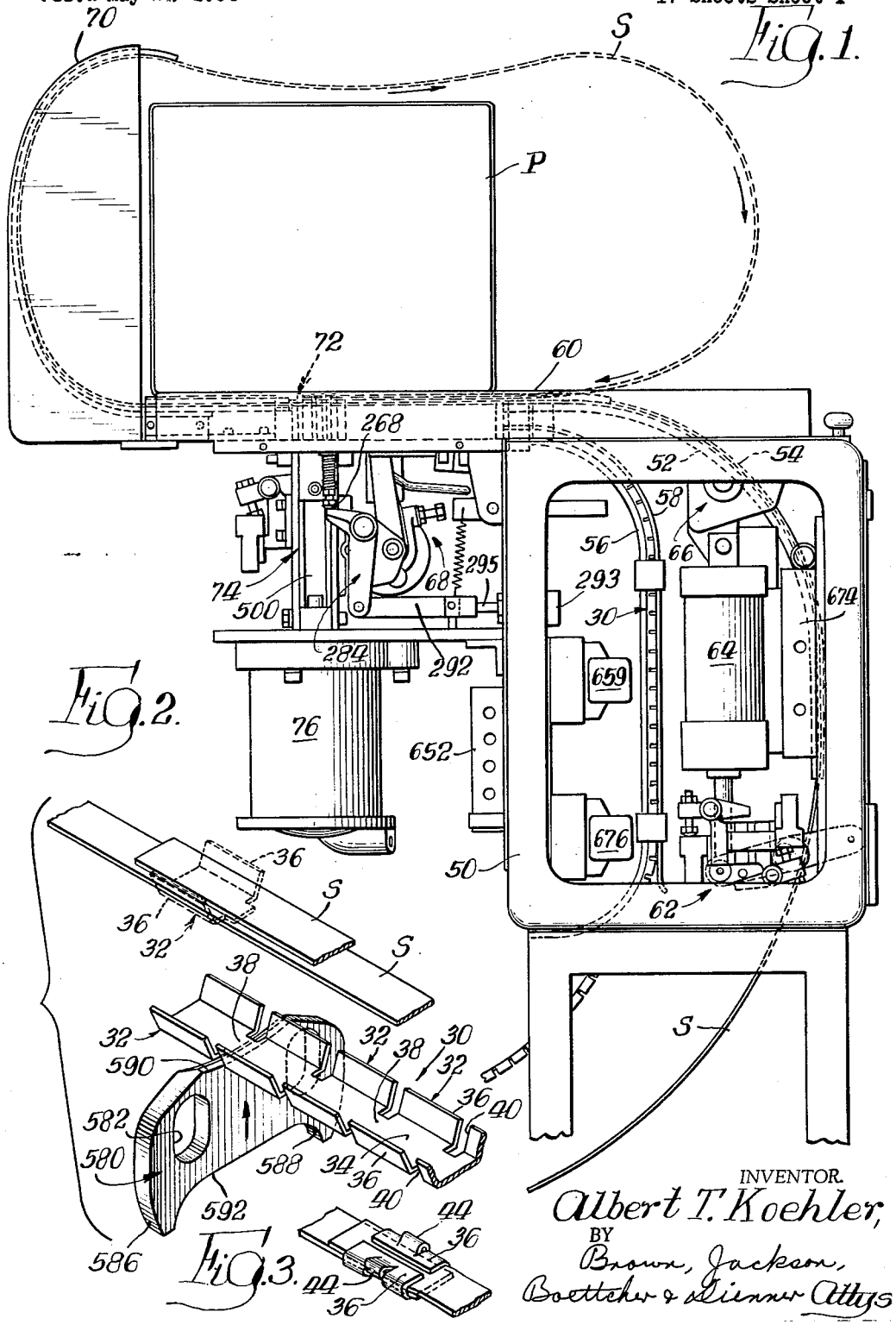
INVENTOR.
Albert T. Koehler,
BY Brown, Jackson,
Boettcher & Dienner Attys

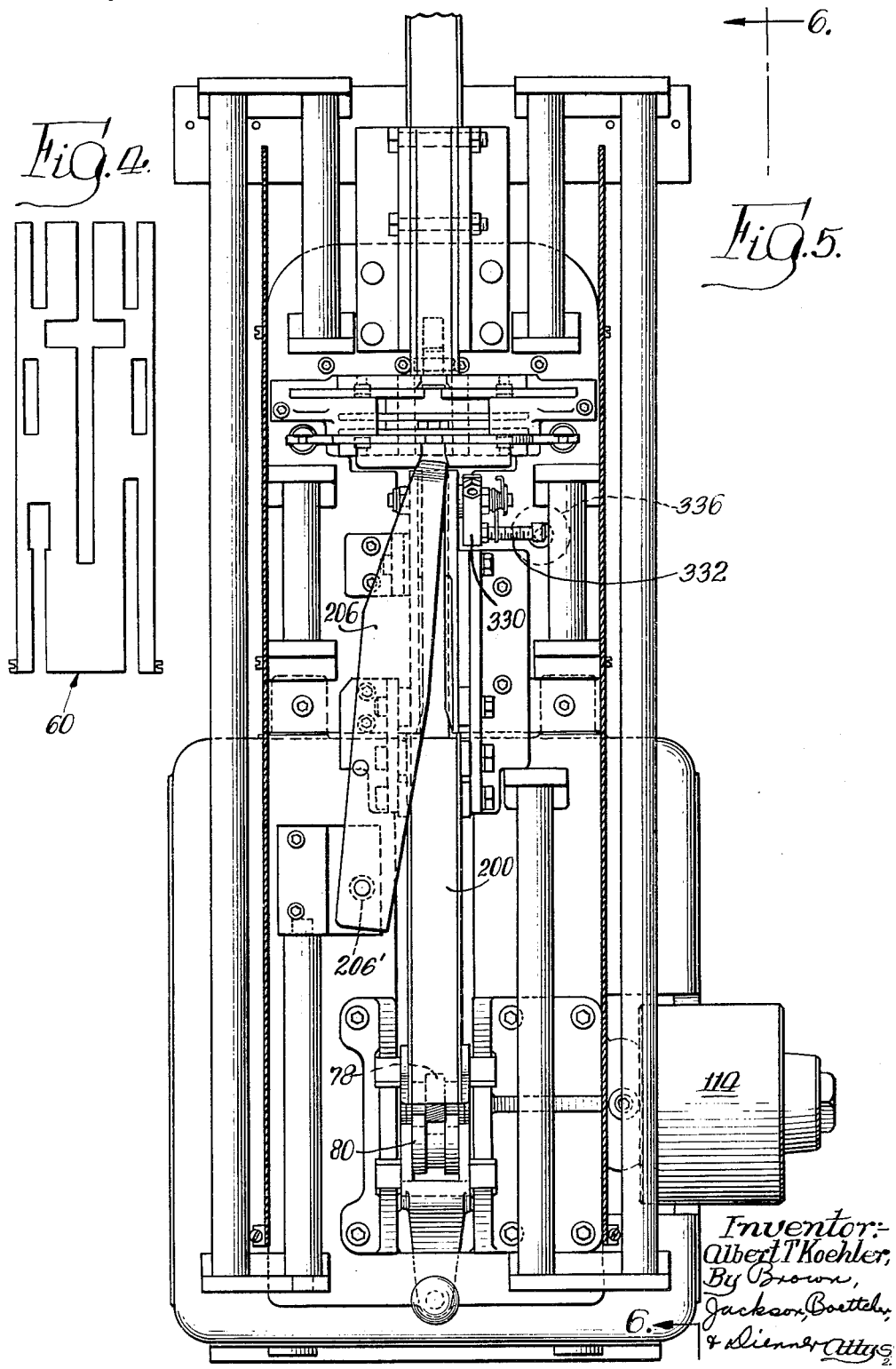

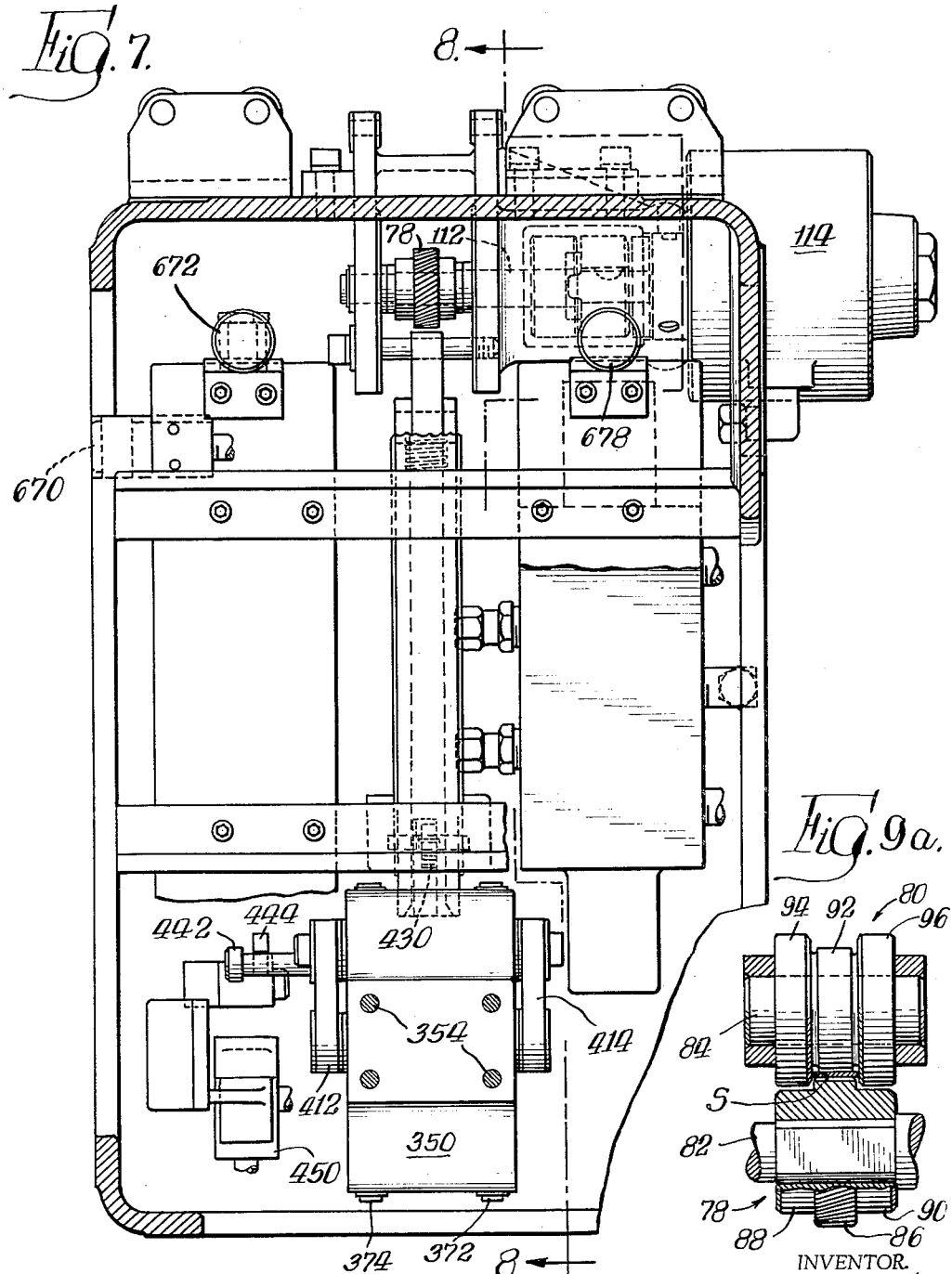

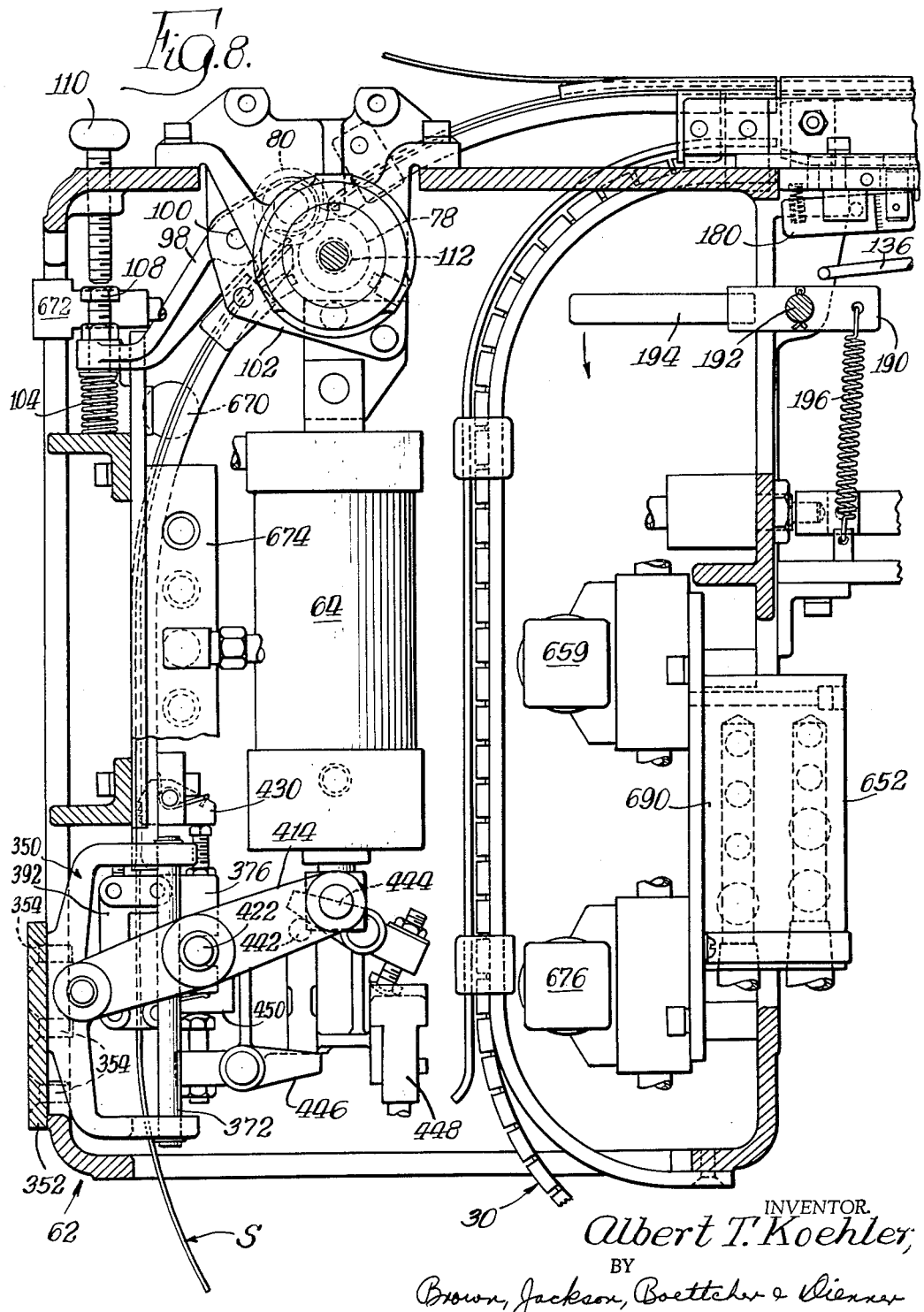

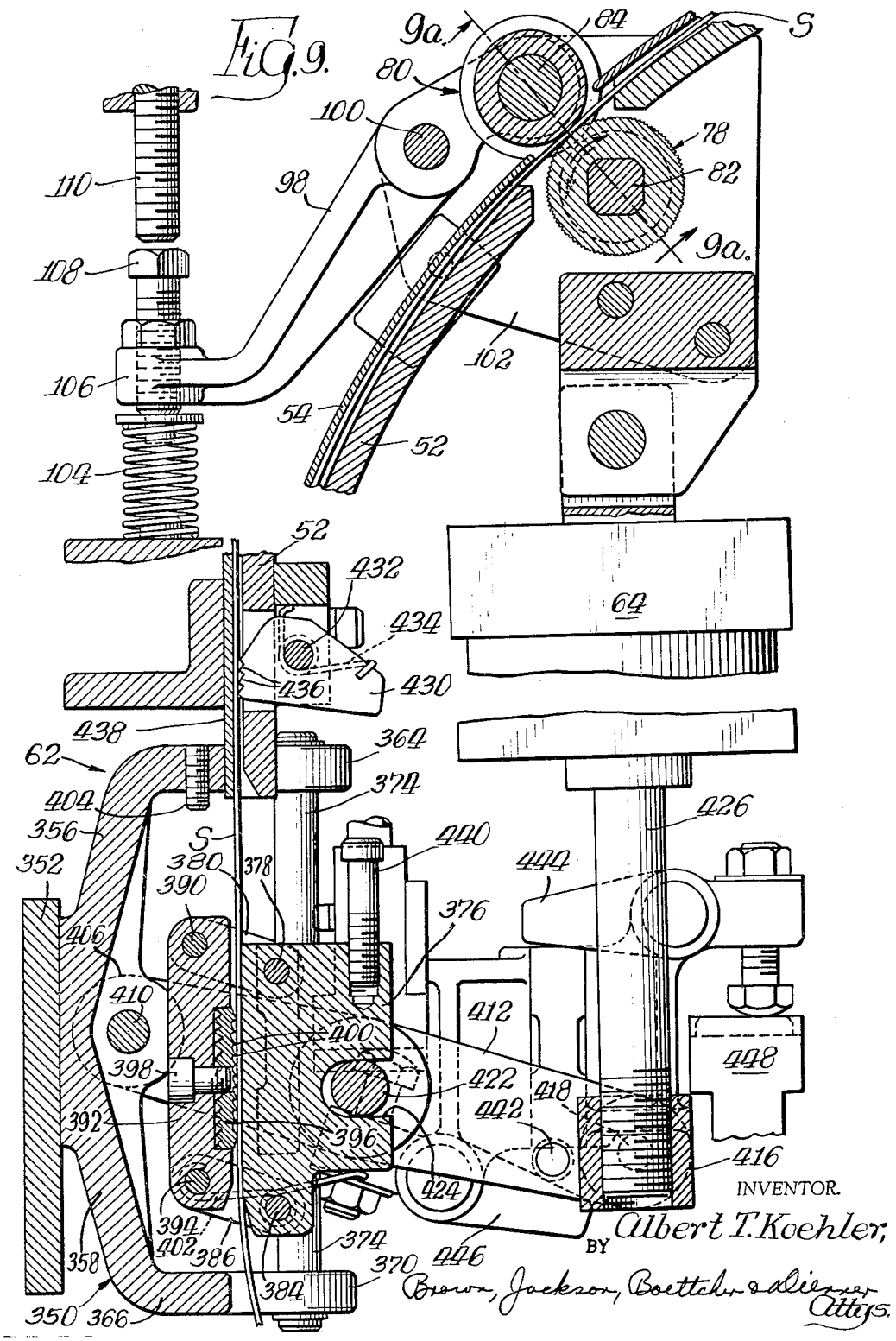

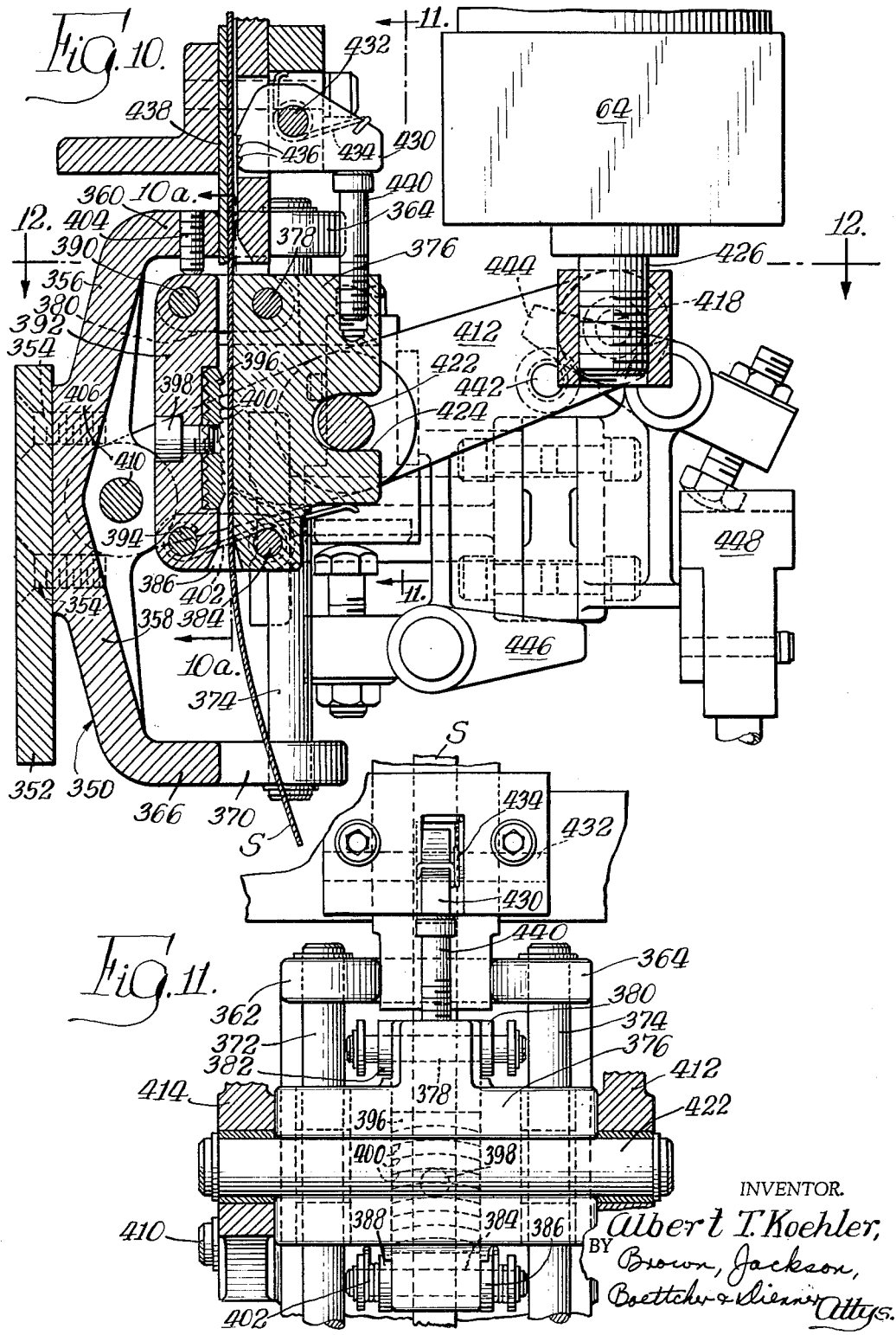

INVENTOR.
Albert T. Koehler,
BY
Brown, Jackson,
Boettcher & Dienner Attys.

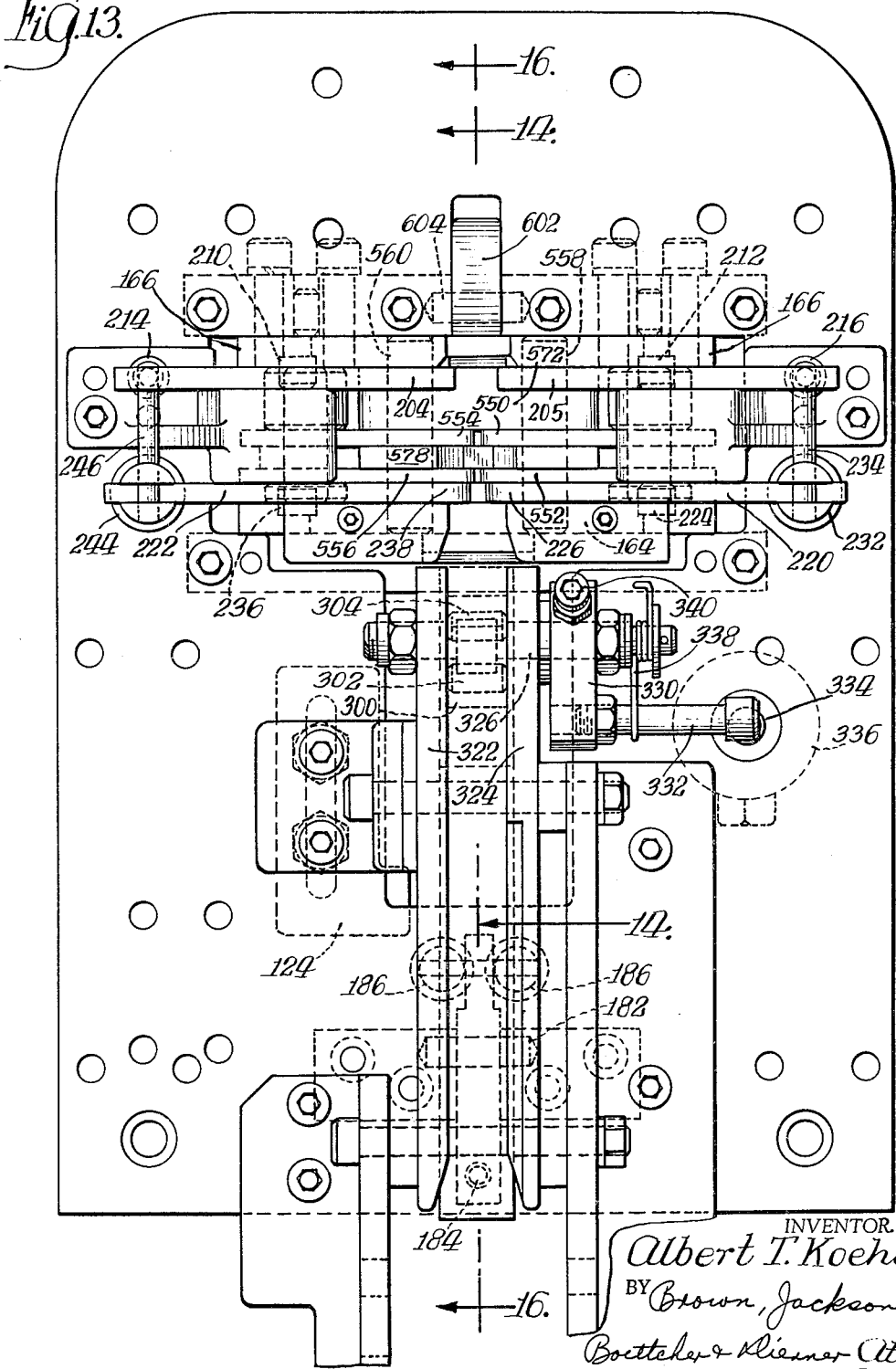

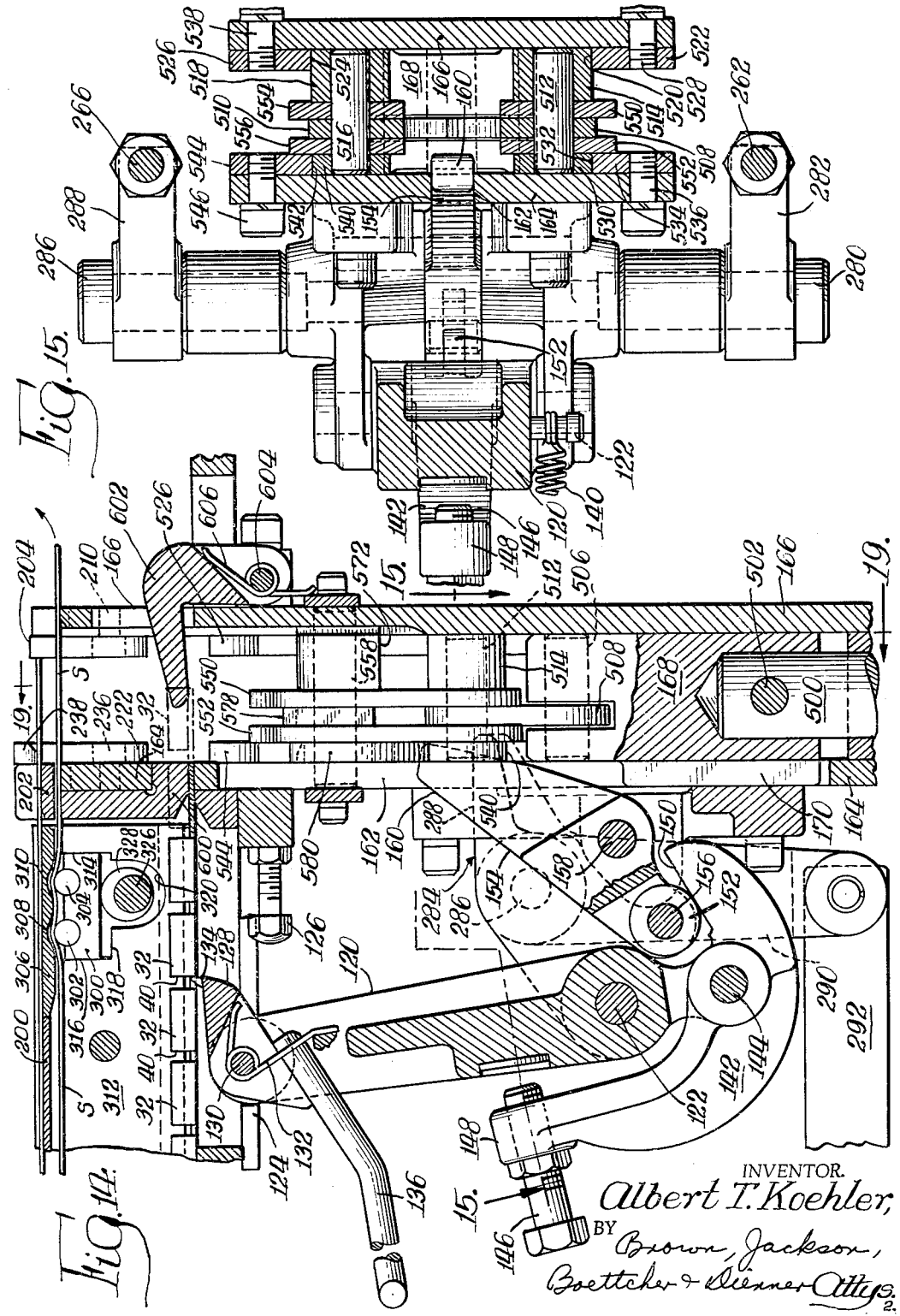

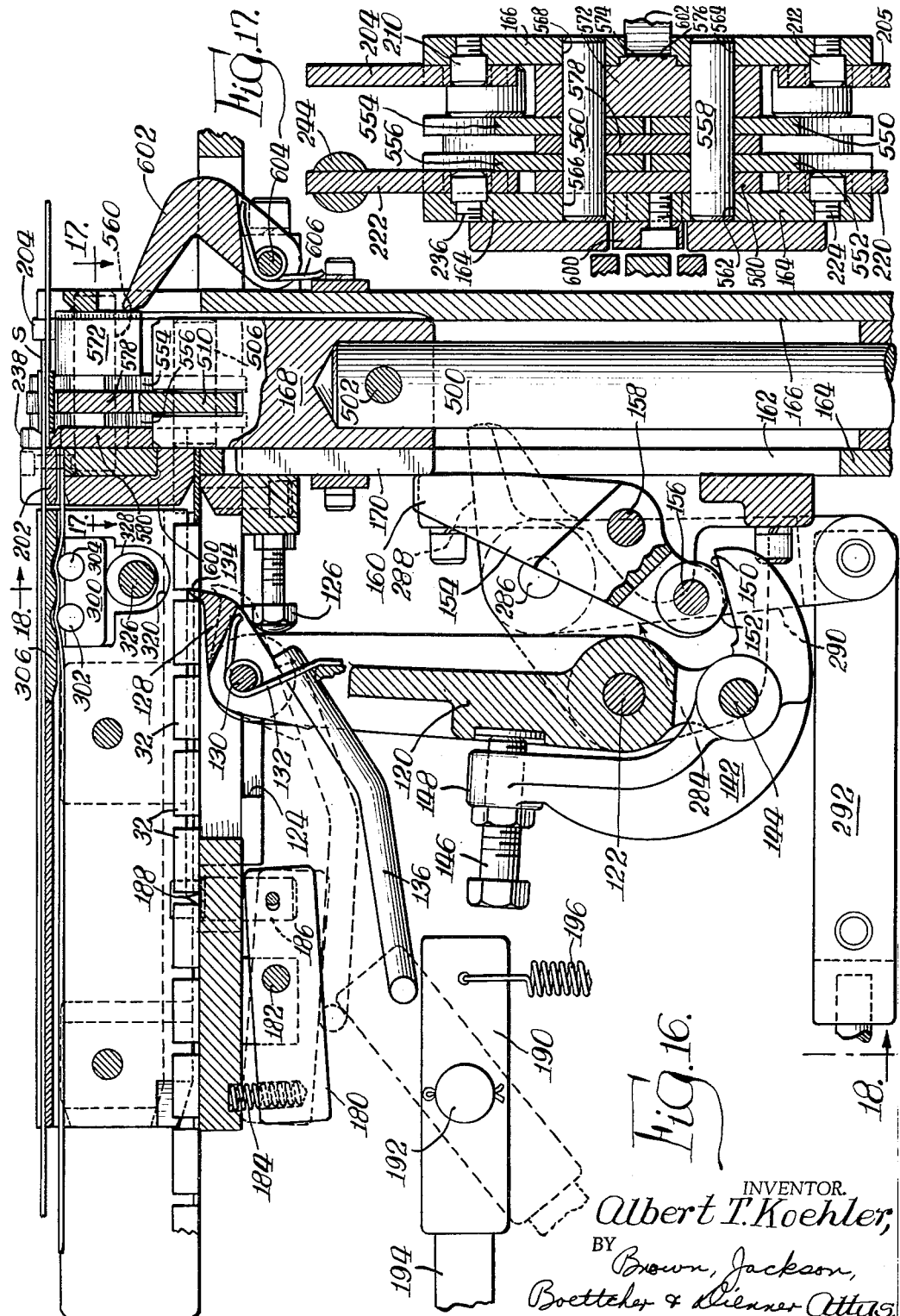

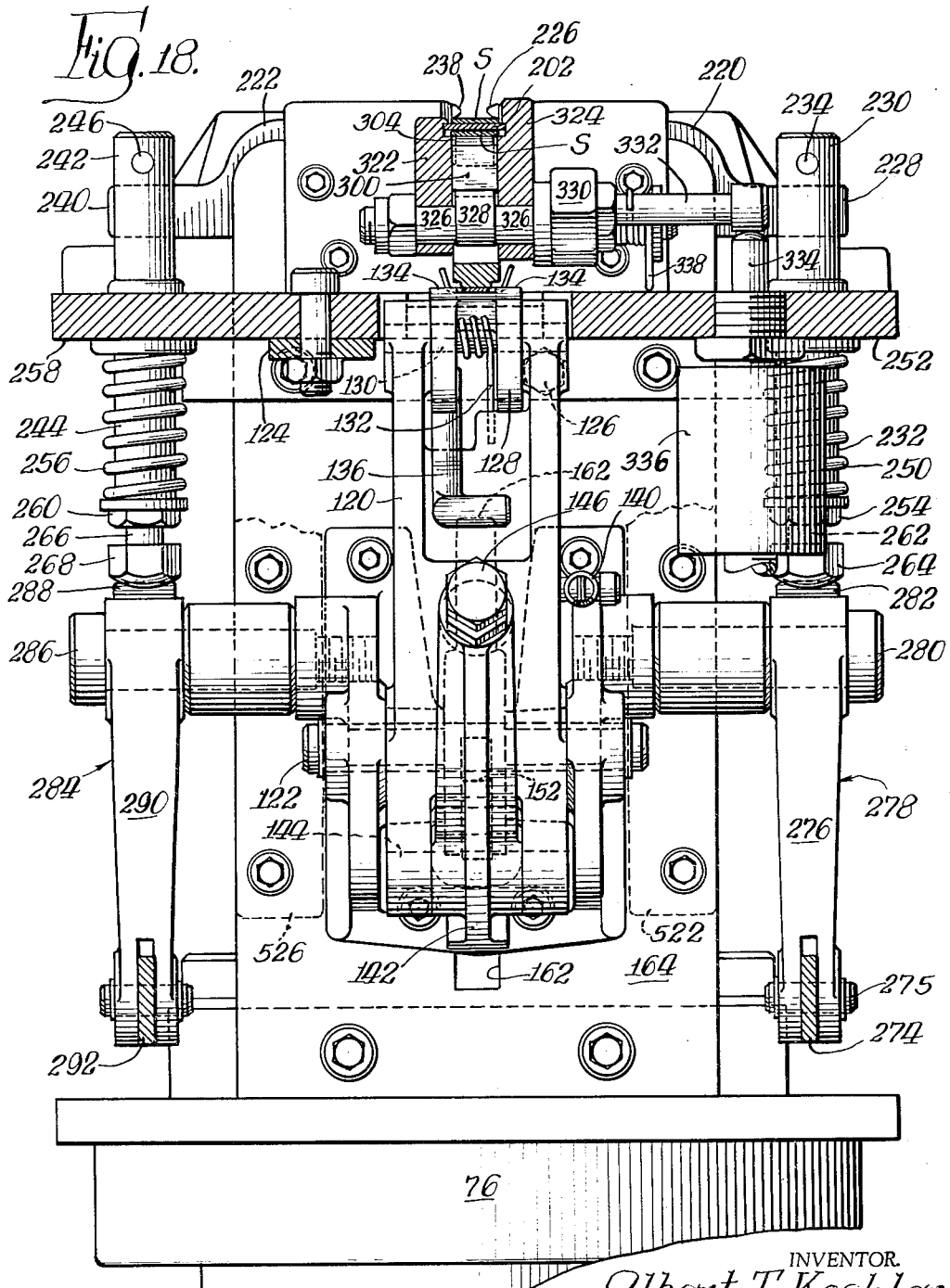

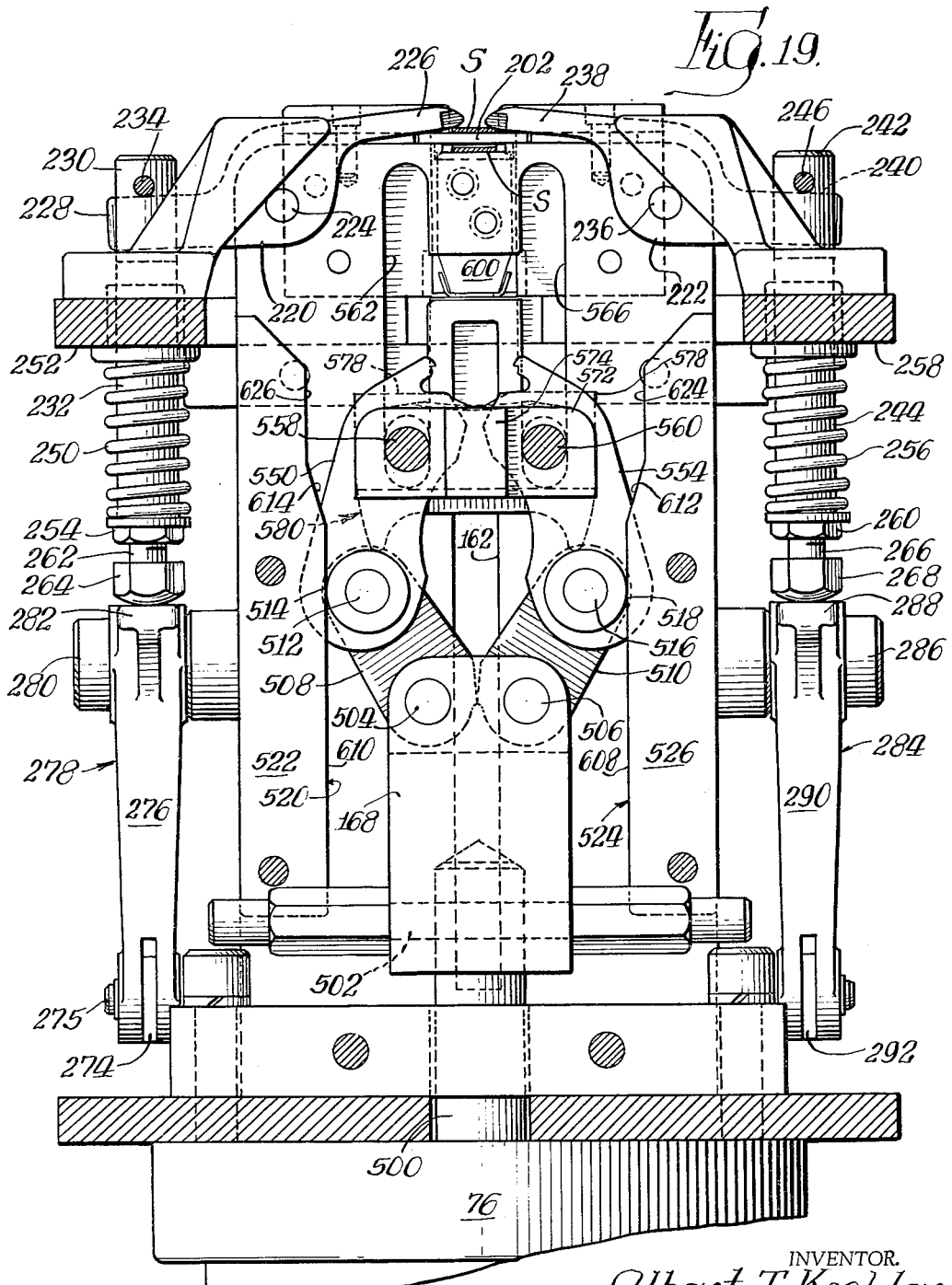

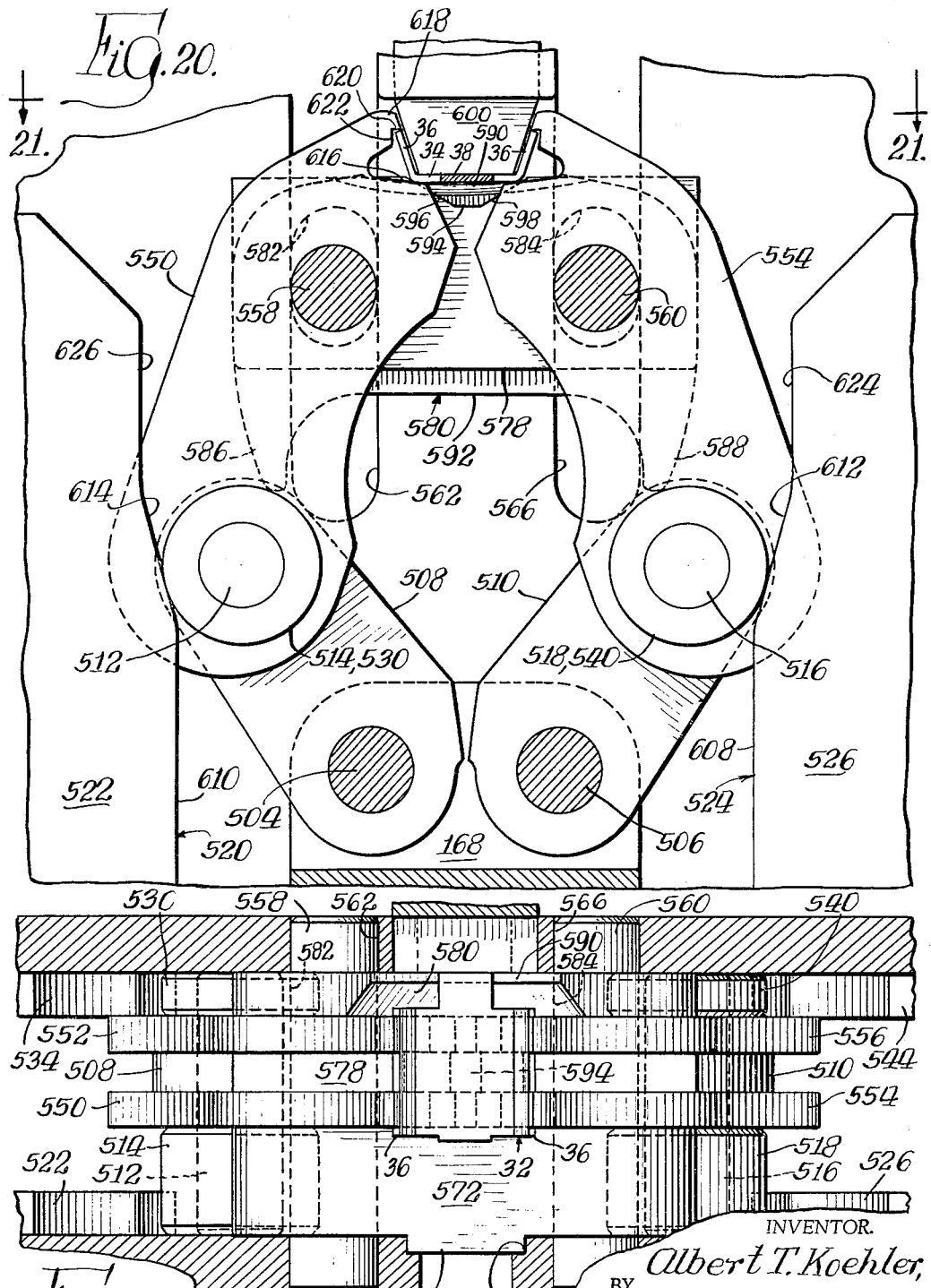

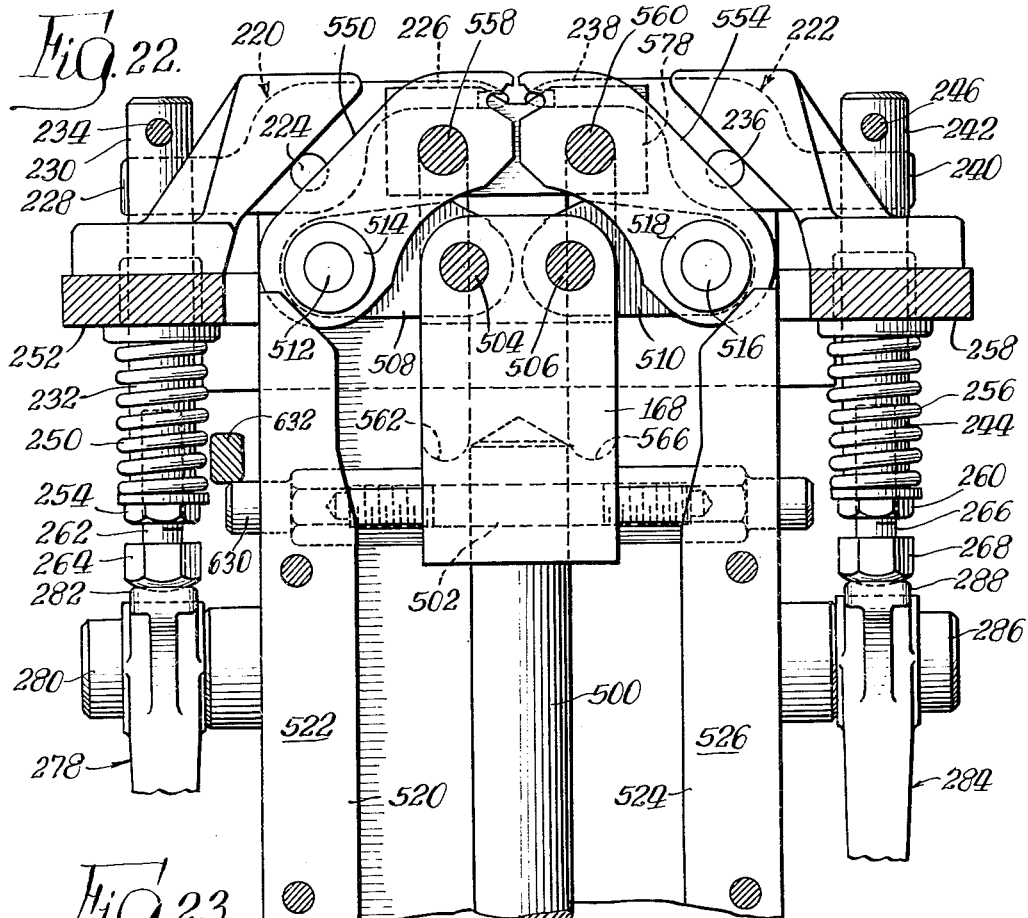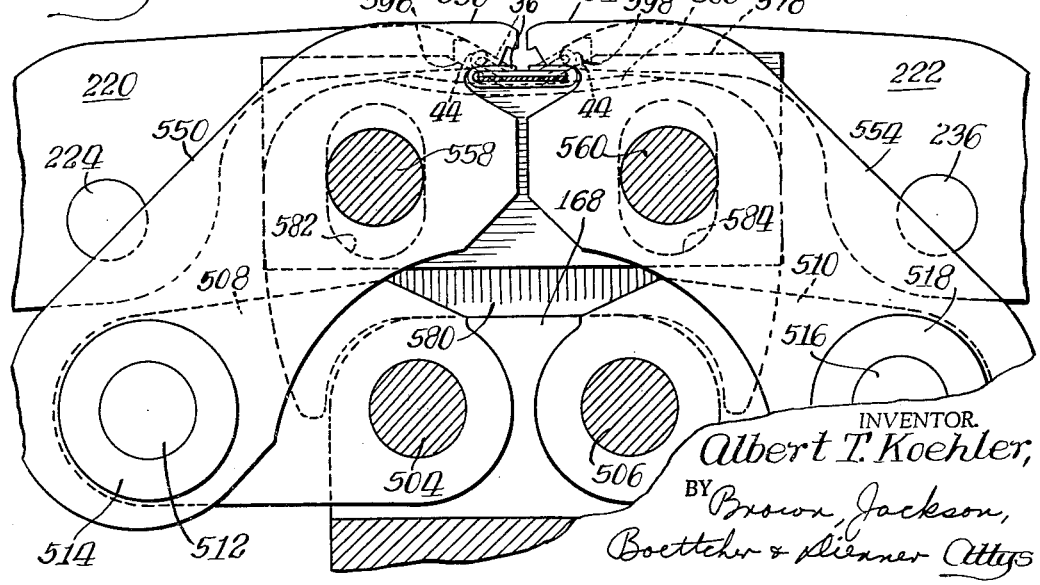

Nov. 2, 1965   A. T. KOEHLER   3,215,064
AUTOMATIC STRAPPING AND SEALING MACHINE
Filed May 25, 1964   17 Sheets-Sheet 16
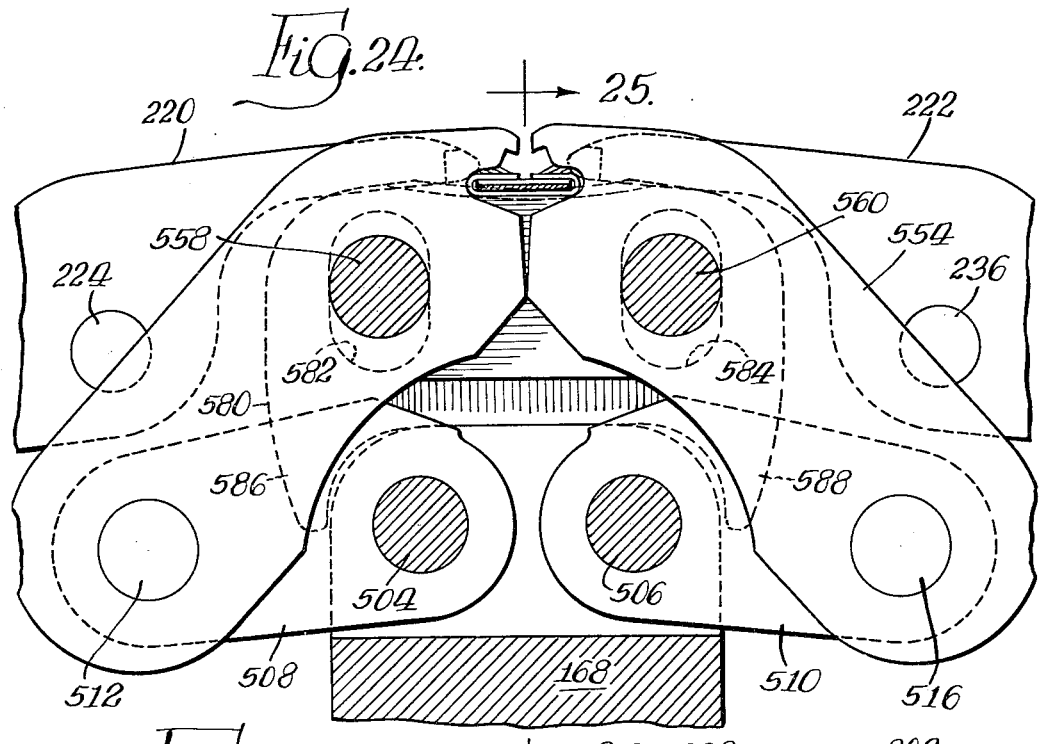
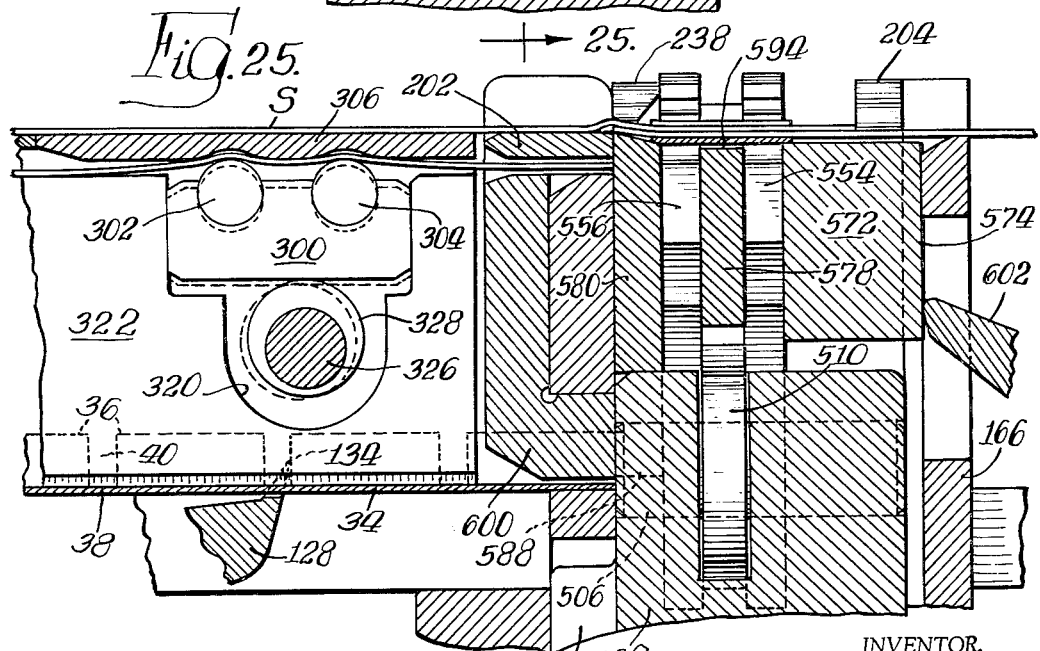
INVENTOR.
Albert T. Koehler,
BY
Brown, Jackson, Boetticher & Dienner
Attys Nov. 2, 1965 A. T. KOEHLER 3,215,064
AUTOMATIC STRAPPING AND SEALING MACHINE
Filed May 25, 1964 17 Sheets-Sheet 17

Fig. 26.

INVENTOR.
Albert T. Koehler,
BY
Brown, Jackson,
Boettcher & Dienner Attys

United States Patent Office 3,215,064
Patented Nov. 2, 1965

3,215,064
AUTOMATIC STRAPPING AND SEALING MACHINE
Albert T. Koehler, Monticello, Ind., assignor to A. J. Gerrard Manufacturing Co., Des Plaines, Ill., a corporation of Illinois
Filed May 25, 1964, Ser. No. 370,032
25 Claims. (Cl. 100—4)

The present invention relates to an automatic strapping and sealing machine for applying strap around an object to be bound and securing the ends of the strap with a seal or the like. More specifically, the invention relates to a strapping machine for feeding out a predetermined length of strap around an object to be bound, holding the free end of the strap, drawing the strap closely around the object and tensioning the strap thereon, applying a seal to overlapped portions of the strap to secure the same together, and cutting the strap so as to free the bound object from the strap supply.

In the embodiment of the invention illustrated, the strap is supplied from a reel which map be mounted on the floor adjacent the strapping machine, and the seals are constructed in the form of a coil of integrally connected seals which are supplied to the strapping machine from a reel supported on a nearby frame or the like. The machine described herein may be termed semi-automatic since a manual operation is required to properly position the free end of the strap prior to the tensioning of the strap and the application of the seal, but it will be understood that the various features of the present invention are applicable as well to fully automatic machines where the positioning of the free end of the strap is wholly automatic.

It is an object of the present invention to provide an improved automatic strapping machine which operates more efficiently and provides greater reliability and durability than the machines heretofore known.

Another object of the invention is to provide a strapping machine which is air-operated and which embodies a novel air control system for regulating the timing and automatic sequential operation of the various components of the machine.

A further object of the invention is to provide improved means including a bleed-off or flow control valve for controlling the amount of strap which is fed out by the machine at the beginning of a strapping operation.

An additional object of the invention is to provide an improved mechanism for tensioning the strap about an object to be bound, such mechanism being adapted to reciprocate a plurality of times so as to provide a plurality of operative tensioning strokes where such is necessary to produce the desired tension in the strap.

Still another object is to provide in an automatic strapping machine improved release mechanism for releasing seal feeding means and seal indexing means when it is desired to freely feed a supply of seals into the machine from a supply reel or the like.

A further object of the invention is to provide improved strap feeding means for advancing the strap through the strapping machine, such feeding means including back-up means which is spaced from the operative portion of the feeding member when there is no strap therebetween.

A still further object is to provide means for automatically straightening the strap which is fed through the strapping machine so that it will more readily follow guide means or the like when the strap is fed out of the machine for application about an object to be bound.

Another of the objects of the present invention is to provide an improved seal feeding mechanism for feeding a seal into an operative position to be cut from the supply coil and applied to the strap.

An additional object of the invention is to provide an improved form of crimper jaw for effecting increased control over a seal which is held therein both prior to and during the crimping of the seal on overlapped portions of the strap.

A further object of the invention is to provide improved holding means for holding the free end of the strap in a desired position during operation of the strapping machine.

Another one of the objects is to provide improved stop means against which the free end of the strap is fed to position the latter for a sealing operation.

Still another object is to provide mechanism for automatically bending the cut end of the strap inwardly after the strap on the object being bound is cut from the strap supply, thereby to avoid the hazard otherwise present due to sharp projecting edges or the like.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

In the drawings:

FIGURE 1 is a side elevational view of a strapping machine constructed in accordance with the present invention;

FIGURE 2 is an exploded perspective view illustrating the cutting of a seal from a continuous coil of connected seals, and showing a seal in position to be crimped about overlapped portions of strap;

FIGURE 3 is a perspective view showing a seal crimped on overlying strap ends to firmly secure the same together;

FIGURE 4 is a detail top plan view of an upper cover plate through which rollers project to support a package or object to be bound;

FIGURE 5 is an enlarged top plan view of the strapping machine of FIGURE 1 with the upper strap guide structure being broken away;

FIGURE 7 is a vertical sectional view taken substantially along the line 7—7 of FIGURE 6;

FIGURE 8 is a vertical sectional view taken substantially along the line 8—8 of FIGURE 7 showing in particular a length of strap and a length of connected seals being fed into the strapping machine;

FIGURE 9 is an enlarged vertical sectional view, partly broken away, taken substantially along the line 8—8 of FIGURE 7, showing the feed wheel and back-up roller mechanism for driving the strap, and also showing the high tension gripper assembly for tensioning the strap;

FIGURE 9a is a fragmentary sectional view taken substantially along the line 9a–9a of FIGURE 9;

FIGURE 10 is an enlarged fragmentary vertical sectional view taken substantially along the line 8—8 of FIGURE 7 showing the high tension gripper assembly in an alternate position relative to FIGURE 9;

FIGURE 11 is a fragmentary vertical sectional view taken substantially along the line 11—11 of FIGURE 10;

FIGURE 13 is an enlarged fragmentary top plan view of the strapping machine of FIGURE 1 with certain components removed for purposes of illustration;

FIGURE 14 is a fragmentary vertical sectional view taken substantially along the line 14—14 of FIGURE 13 showing the sealing mechanism and also seal feed means for feeding a seal into an operative position prior to a sealing operation;

Figure 6:
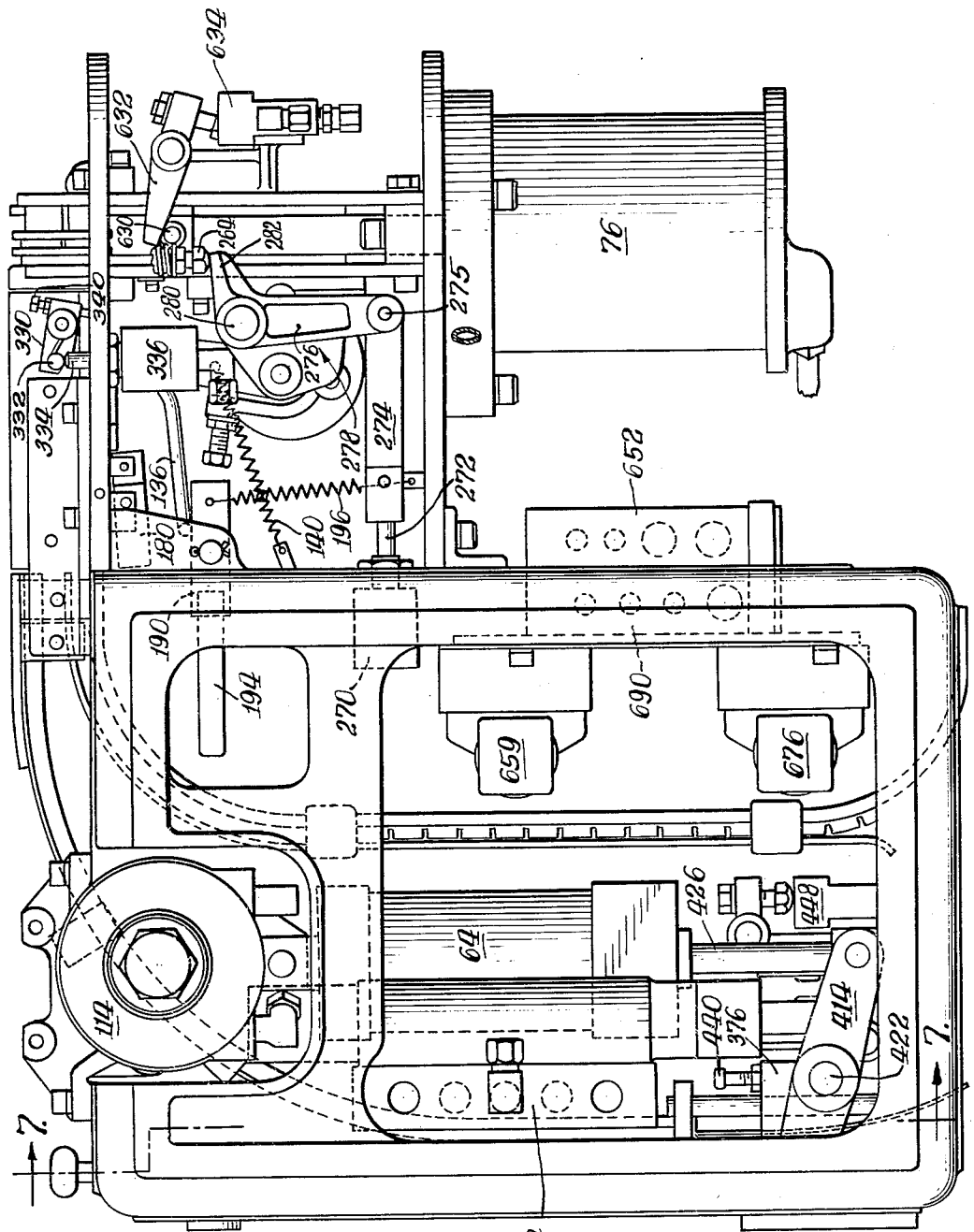
FIGURE 6 is a side elevational view looking substantially in the direction of the arrows 6—6 of FIGURE 5.

FIGURE 15 is a sectional view taken substantially along the line 15—15 of FIGURE 14;

FIGURE 16 is a view similar to FIGURE 14, taken along the line 16—16 of FIGURE 13, showing the sealing mechanism and seal feed means in alternate positions, and also showing manual release means for releasing both the seal feed means and seal indexing means;

FIGURE 17 is a fragmentary horizontal sectional view of the sealing mechanism taken substantially along the line 17—17 of FIGURE 16;

FIGURE 18 is a vertical sectional view taken substantially along the line 18—18 of FIGURE 16;

FIGURE 19 is a fragmentary vertical sectional view taken substantially along the line 19—19 of FIGURE 14 showing the sealing mechanism in a lowered position prior to the carrying out of a sealing operation;

FIGURE 20 is a substantially enlarged fragmentary vertical sectional view taken substantially along the line 19—19 of FIGURE 14 showing the crimper jaws closed about a seal for holding the same during and subsequent to the cutting of the seal from the supply strip of connected seals;

FIGURE 21 is a horizontal sectional view taken substantially along the line 21—21 of FIGURE 20;

FIGURE 22 is a fragmentary vertical sectional view similar to FIGURE 19 showing the sealing mechanism in its upper position at the completion of the crimping operation;

FIGURE 23 is a substantially enlarged fragmentary vertical sectional view of a portion of the mechanism shown in FIGURE 22, the crimping jaws and related structure again being shown at the completion of a crimping operation;

FIGURE 24 is a view similar to FIGURE 23 showing a clevis or piston rod head and a knife of the sealing mechanism moved still further upwardly to press upwardly on a cut end of the strap, the crimper jaws being shown opened slightly due to such further upward movement of the clevis;

FIGURE 25 is a fragmentary vertical sectional view taken substantially along the line 25—25 of FIGURE 24 showing the manner in which the knife presses upwardly on the cut end of the strap at the completion of the upward stroke of the clevis and knife; and FIGURE 26 is a schematic diagram of the air control circuit for the air operated strapping machine of the present invention.

The strapping machine of the present invention is an improvement of an earlier form of apparatus disclosed in my U.S. Patent 3,066,599, which patent is assigned to the assignee of the present invention. Strap is fed to the machine from a reel which may be mounted on the floor, a predetermined amount of the strap being fed out of the machine and substantially around an object to be bound at the beginning of a strapping operation. In accordance with the embodiment described herein, the free end of the strap is then manually fed under the package or object and against a stop to complete a closed loop with the free end of the strap disposed in overlying relation to the strap coming from the machine, whereby after drawing the strap tight and applying tension thereto, the strapping operation may be completed by applying a seal to the overlapped strap portions and then cutting the strap to separate the closed loop on the bound object from the strap supply. As stated earlier herein, the seals are fed to the machine from a continuous strip or reel of integrally connected seals.

FIGURE 2 shows a strip 30 of connected seals 32 each having a base portion 34 and a pair of side walls 36 which extend upwardly and slightly outwardly, the base portions 34 being integrally connected by connecting portions 38 which are adapted to be cut to separate one seal from the supply strip 30 during a strapping operation. It will be seen that in the continuous strip 30 of seals 32 there are slots 40 formed between the side walls 36 of each adjacent seal, which slots extend partially into the base portions 34, and as will be seen more clearly hereinafter such slots facilitate the feeding and indexing of the seals as they are passed through the machine. During a sealing operation, means including a movable knife 580 are moved upwardly to sever one of the connecting portions 38 to separate one seal from the supply strip, and such seal is then carried upwardly as will be described hereinafter and positioned about overlapped portions of the strap S as shown in FIGURE 2. Thereafter, the end walls 36 of the seal are bent down on the top of the upper layer of strap S as shown in FIGURE 3, and the seal is crimped to form the partially sheared or punched offset portions 44 which prevent the joint from separating.

General structure

FIGURE 1 shows a strapping machine in accordance with the present invention including a frame 50, guide portions 52 and 54 through which a supply of strap S is fed to the machine, guide portions 56 and 58 through which a supply strip 30 of connected seals is supplied to the machine, and a cover plate or table 60 through which rollers project to support a package or object to be bound prior to a strapping operation, a package to be strapped being shown at P in the drawing. The strap supply S is fed through a high tension assembly indicated generally at 62 and operated by a high tension cylinder 64, and the strap is moved through the machine by strap feed means indicated generally at 66.

Upon initiation of a strapping operation, the strap feed means 66 function to feed a predetermined length of strap S out of the machine to a guide member 70 disposed above the table 60, whereby the guide 70 causes the strap to pass over the top of the package P and substantially encircle the package. The operator then manually takes the free end of the strap S and inserts it back under the package and against stop means indicated generally at 72, whereby the free end of the strap overlies the strap being supplied from the machine. Sealing mechanism indicated generally at 74 is disposed beneath the overlapped strap portions in the area of the extreme free end of the strap S where a seal 32 is to be applied, and such mechanism is operated by a sealing cylinder 76.

Strap feeding mechanism

FIGURE 9 shows the strap S fed between guide members 52 and 54 and between a serrated drive roller 78 and a back-up roller 80, the drive roller being mounted on a drive shaft 82 and the back-up roller being carried on a pin 84. Referring to FIGURE 9a, it will be seen that that drive roller 78 comprises a serrated axially intermediate portion 86 and a pair of non-serrated cylindrical portions 88 and 90 of reduced diameter disposed on either side thereof. The back-up roller 80 includes an axially intermediate portion 92 of reduced diameter, and a pair of cylindrical portions 94 and 96 of greater diameter at either side thereof. The serrated drive roller 78 and back-up roller 80 are dimensioned so that when there is no strap S therebetween the axially outer roller portions 88 and 90 on the drive roller 78 will engage the axially outer portions 94 and 96 on the back-up roller 80 so as to maintain a clearance of approximately 0.005 inch between the serrated portion 86 of the drive roller and the central portion 92 of the back-up roller, whereby the serrated portion of the drive roller is always maintained out of contact with the back-up roller. When strap is fed between the foregoing two rollers, the strap is thicker than the above-mentioned 0.005 inch clearance, so that the axially outer portions on each of the two rollers will be maintained spaced apart, and the portion 92 on the back-up roller will urge the strap against the serrated portion 86 of the drive roller.

Referring again to FIGURE 9, the pivot pin 84 for the back-up roller 80 is carried on the end of a lever 98 which is pivotally mounted on a fixed pin 100 mounted on a frame portion 102. A compression spring 104 acts upon an end 106 of the lever 98 to urge the lever 98 in a clockwise direction thereby to yieldingly urge the back-up roller 80 toward the serrated drive roller 78. An upwardly projecting adjustable screw 108 is carried by the end 106 of the lever 98, and a release screw 110 (see FIGURE 8) may be threaded downwardly to depress the screw 108 and pivot the lever 98 in a counterclockwise direction to move the back-up roller 80 away from the serrated drive roller 78, as when a new reel of strap is being initially fed into the machine.

FIGURE 7 shows the serrated drive roller 78 mounted on the end of a drive shaft 112 and driven by an air-operated motor 114. The motor 114 is reversible and is driven in a forward direction to feed out a predetermined length of strap S to be positioned around an object to be bound as shown in FIGURE 1. The motor 114 is driven in the reverse direction after the free end of the strap is held, so as to take out the slack and draw the strap closely around the object. FIGURE 5 is a top plan view which shows the motor 114, drive roller 78 and back-up roller 80.

*Seal feeding mechanism*

Referring to FIGURES 14–16, there is shown a seal feed pawl lever 120 which is pivotally mounted on a fixed pivot pin 122 for movement between a counterclockwise position where it is engaged against a rearward stop member 124 and a clockwise position where it is engaged against a forward stop member 126. A feed pawl 128 is pivotally mounted on a pin 130 at the upper end of the feed pawl lever, and the feed pawl 128 is biased in a counterclockwise direction by a torsion spring 132. Referring to FIGURES 14 and 18, the feed pawl 128 is provided with a pair of projecting portions 134 at its extreme upper end which extend into the spaces or slots 40 between each seal 32 in the continuous strip 30 of connected seals. A release lever 136 extends from the feed pawl 128, whereby when the release lever is manually raised, the pawl 128 will be rotated in a clockwise direction so as to withdraw the projecting portions 134 from the slots between the seals, as when a new supply strip 30 of seals is being initially fed into the machine.

It will be understood from the foregoing that when the feed pawl lever 120 is moved from the forward position of FIGURE 16 to the rearward position of FIGURE 14, the feed pawl 128 will be caused to rotate in a clockwise direction, and the upper ends of the projections 134 will ride along the bottom 34 of the strip of seals until they reach the next rearward pair of slots 40, whereupon the pawl will spring back to its operative counterclockwise position as shown in FIGURE 14. Accordingly, when the lever 120 is next moved to the forward position of FIGURE 16, it will advance the strip 30 of seals forwardly so as to position the leading seal 32 in the position shown in dotted lines in FIGURE 14 preparatory to a sealing operation.

In order to actuate the seal feed pawl lever 120, there is provided a tension spring 140 (see FIGURE 6) which has one end anchored to the frame of the machine and its other end secured to the lever 120 so as to bias the latter rearwardly or in a counterclockwise direction. A seal feed control lever 142 is pivotally mounted on a pin 144 carried at the lower end of the lever 120. The control lever 142 is arcuate in its configuration and is provided with an adjusting screw 146 which is threaded through one end 148 of the lever 142 for operative engagement with the lever 120 in order to actuate the latter forwardly. The other end of the lever 142 comprises a generally flat surface 150 which is engaged by a roller 152 carried on the end of a seal feed cam 154. The roller 152 is mounted on a pin 156, and the seal feed cam 154 is pivotally mounted on a fixed pin 158.

The upper end 160 of the seal feed cam 154 is aligned with a vertical slot 162 (see FIGURES 14, 15, 18 and 19) formed in a side plate 164, and in its normal position the upper end of the seal feed cam will project through the slot 162 into the space between the side plate 164 and an opposite side plate member 166 as shown in FIGURE 14. It will be understood that when the cam 154 is thus positioned as shown in FIGURE 14, the seal feed pawl lever 120 will be disposed in its rearward position to which it is biased by the tension spring 140. Disposed between the side plates 164 and 166 is a clevis or piston head member 168 which comprises a component of the sealing mechanism 74 to be described more fully later herein, and the clevis 168 is movable vertically between the side plates between a lowered position as shown in FIGURE 14 and a raised position as shown in FIGURE 16.

The clevis 168 has a vertical rib 170 formed on one side thereof which projects into the slot 162 in the side plate 164 and thereby assists in guiding the clevis during its vertical movement. When the clevis 168 is in its down position as in FIGURE 14, the seal feed cam 154 will project into the slot 162 in the manner previously described. However, when the clevis is raised, the vertical rib 170 thereon will engage the inner portion of the seal feed cam 154 and force it out of the slot 164 to the position shown in FIGURE 16 where the upper end 160 of the seal feed cam will be engaged against the rib 170. When the seal feed cam 154 is thus pivoted in a counterclockwise direction, the roller 152 carried on the cam will engage against the surface 150 on the control lever 142 so as to pivot the control lever in a clockwise direction about the pivot pin 144, whereupon the adjusting screw 146 on the upper end of lever 142 will be brought into engagement with seal feed pawl lever 120 so as to move the latter to its forward position of FIGURE 16.

It will be understood from the foregoing that when the clevis 168 is moved downwardly to its lowered position, the lever 120 will move back to dispose the projections 134 in the next rearwardly positioned slots 40 in the strip 30 of seals, and when the clevis is moved upwardly at the beginning of a sealing operation the lever 120 is actuated forwardly to feed the leading seal 32 to the position shown in dotted lines in FIGURE 14. It will further be understood that the timing of the mechanism is such that the leading seal 32 will be operatively positioned in the space between the side plates 164 and 166 before the knife 580 and the various other components of the sealing mechanism 74 reach the seal, as will be explained more fully hereinafter. The amount by which the strip 30 of seals 32 is fed forwardly by the lever 120 and pawl 128 can be adjusted by threading the adjusting screw 146 toward or away from the lever 120. Thus, when the screw 146 is threaded toward lever 120, the operative stroke of the latter will be increased, thereby increasing the distance by which the strip of seals is fed forwardly. The forward stop 126 is also adjustable and must of course be positioned in relation to the stroke of the lever 120. The purpose of the stop 126 is to prevent the momentum of the lever 120 from carrying it past the position to which it is actuated by the control lever 142 and pin 146.

FIGURE 16 shows an index pin lever 180 which is pivotally mounted on a fixed pin 182 and which is biased in a counterclockwise direction by a compression spring 184. The lever 180 carries a pair of index pins 186 each having a projecting portion 188 on its upper end, and the projecting portions 188 extend into the spaces or slots 40 in the strip 30 of connected seals for accurately positioning the latter. When the strip 30 of seals is fed forwardly by the pawl 128 and lever 120 as described hereinabove, the projecting portions 188 on the index pins are urged downwardly out of the slots 40, the lever 180 thus being pivoted in a clockwise direction to the position shown in dotted lines in FIGURE 16, whereby the portions 188 ride along the underside 34 of the seals 32 until the next pair of slots 40 come into alignment with the index pins, at which time the lever 180 returns to the position shown in solid lines in FIGURE 16. The function of the index pin assembly is to accurately position the strip 30 of seals, and also to prevent the seals from being moved in a rearward direction. Preferably the projecting portions 188 are approximately vertical on the right hand or forward side thereof to prevent them from being cammed downwardly out of the slots 40 when the seals are urged rearwardly during operation of the machine.

FIGURE 16 further shows a release lever 190 which is pivotally mounted on a fixed pin 192 and is provided with a handle 194 to permit the lever to be manually rotated in a counterclockwise direction to the approximate position shown in dotted lines. The lever 190 is normally disposed in the position shown in solid lines in FIGURE 16 and is retained in such position by a tension spring 196. However, when the lever 192 is manually pivoted in a counterclockwise direction to the position shown in dotted lines, the end of the lever 192 engages a transverse rear end portion of the lever 136 so as to pivot the latter in a clockwise direction causing the seal feed pawl 128 to be moved to released position. In addition, when the handle 136 is thus moved to the position shown in dotted lines, it engages the underside of the index pin lever 180 and pivots the latter to its released position as also shown in dotted lines in the drawing. Accordingly, both the seal feed pawl 128 and the index pins 186 can be moved to released positions by the single manual operation of depressing the handle 194 on the dual release lever 190.

*Strap positioning and holding mechanism*

When the strap S is fed forwardly through the machine, it passes to the right as viewed in FIGURE 14 under a strap guide member 200 and under a fixed strap cutter 202. The strap then passes under stop means 72 which comprises a pair of stop members, one of which is shown at 204 in FIGURE 14, after which the strap follows the guide 70 as shown in FIGURE 1 and substantially encircles an object to be bound. The free end of the strap is then manually inserted under the package to form a closed loop, the strap being passed over the guide 200 and under a spring loaded guide and retainer member indicated at 206 in FIGURE 5, a compression spring being shown at 206' which acts on one end of the guide member to bias the opposite end thereof downwardly against the strap. Consequently, the free end of the strap S is fed back over the fixed strap cutter 202 until it engages against the stops as shown at 204. It will thus be seen that the strap is overlapped in the area between the side plates 164 and 166, and the space between the upper and lower layers of strap is approximately equal to the thickness of the strap cutter 202. FIGURES 18 and 19 are transverse vertical sections which also show the manner in which the strap cutter 202 separates the overlapped upper and lower strap portions.

FIGURE 13 shows the stop member 204 and also an oppositely disposed stop member 205. The two stops 204 and 205 extend towards one another and their inner ends are spaced apart less than the width of the strap S, whereby when the free end of the strap is fed back in overlapping relation to the strap supply as described hereinabove, it will necessarily be stopped when it engages against the members 204 and 205. Referring to FIGURES 13 and 17, the stop 204 is pivotally supported from the side plate 166 by a pin 210, and the stop 205 is pivotally supported from the side plate 166 by a pin 212. In addition to stopping and thereby positioning the upper layer or free end of the strap S, the stops 204 and 205 also serve to retain the lower layer of strap S in a desired position during a strapping operation. FIGURE 13 shows a compression spring 214 for biasing the outer end of the stop 204 upwardly, and a compression spring 216 for biasing the outer end of the stop 205 upwardly, whereby the inner ends of the stops 204 and 205 are both yieldingly urged downwardly on the top of the portion of the strap S which passes therebeneath. More importantly, however, is the fact that an object to be bound is positioned on top of the machine so as to be disposed on top of the stops 204 and 205, whereby the object or package itself will hold the stops down and the stops in turn will maintain the lower layer of strap approximately horizontal in the area between the side plates 164 and 166, even when the strap is drawn tight around the package.

Once the strap S has been positioned as shown in FIGURE 14, it is necessary to hold the upper layer or free end of the strap prior to feeding the lower layer or strap supply in a reverse direction to draw it closely around the package. FIGURE 19 shows a pair of holding pawls 220 and 222 which are provided for this purpose. The holding pawl 220 is pivotally mounted on a pin 224, and the inner end of the pawl comprises a long finger portion 226 which extends over the top of the upper layer of strap at one side thereof and is adapted to bear downwardly to hold the strap. The outer portion of the holding pawl 220 comprises an arm 228 which extends into a slot in a U-shaped upper end 230 of a vertically movable actuator rod 232. Accordingly, when the actuator rod 232 is moved upwardly, the holding pawl 220 is pivoted in a clockwise direction as viewed in FIGURE 19 so as to cause the finger portion 226 to bear down upon and hold the upper layer or free end of the strap S. A cross pin 234 is positioned in the upper end 230 of the actuator rod immediately above the arm 228, whereby when the rod 232 is moved downwardly, the holding pawl 220 will be pivoted in a counterclockwise direction to release the strap. In a similar fashion, the holding pawl 222 is pivotally mounted on a pin 236, and the inner end of the pawl comprises a long finger portion 238 which extends over the top of the upper layer of strap at the other side thereof and is adapted to bear downwardly to hold the strap. The outer portion of the holding pawl 222 comprises an arm 240 which extends into a slot in a bifurcated or U-shaped upper end 242 of a vertically movable actuator rod 244. Accordingly, when the actuator rod 244 is moved upwardly, the holding pawl 222 is pivoted in a counterclockwise direction as viewed in FIGURE 19 so as to cause the finger portion 238 to bear down upon and hold the upper layer or free end of the strap S. A cross pin 246 is positioned in the upper end 242 of the actuator rod immediately above the arm 240, whereby when the rod 244 is moved downwardly, the holding pawl 222 will be pivoted in a clockwise direction to release the strap.

As shown in FIGURES 13, 14 and 17, the pin 224 which pivotally carries the holding pawl 220 is mounted in the side plate 164, as is the pin 236 which pivotally carries the holding pawl 222. Also, as best shown in FIGURE 14 with respect to the finger portion 238 of the holding pawl 222, the holding pawls 220 and 222 bear down upon the upper layer or free end of the strap S in an area immediately adjacent to the fixed strap cutter 202 which provides vertical support for the upper layer of strap. Accordingly, the upper layer of strap is firmly held due to the cooperation between the holding pawls 220 and 222 and the fixed strap cutter 202. It is also important to note that the lower layer of strap S which passes under the strap cutter 202 is not in any way held by the holding pawls 220 and 222 and is thus free to be moved in a reverse direction to draw the strap closely around the object to be bound as will be described more fully hereinafter.

The mechanism for actuating the holding pawls 220 and 222 will now be described. As shown in FIGURE 19, a compression spring 250 is mounted on the actuator rod 232 so as to extend between a fixed frame portion 252 and a nut 254 on the rod, whereby the spring 250 urges the rod 232 downwardly so as to bias the holding pawl 220 to its released position. Similarly, a compression spring 256 is mounted on the actuator rod 244 so as to extend between a fixed frame portion 258 and a nut 260 on the rod, whereby the spring 256 urges the rod 244 downwardly so as to bias the holding pawl 222 to its released position. A screw 262 is threaded into the lower end of the actuator rod 232 and a downwardly disposed head 264 on the screw provides a bearing surface for actuating the rod upwardly, a similar screw 266 having a head portion 268 being provided for the actuator rod 244.

FIGURE 6 shows an air cylinder 270 and an associated horizontally movable piston 272, the end of the latter being connected with a horizontal link 274. The other end of the link 274 is connected by a pin 275 to the lower end of a downwardly depending arm 276 on a bellcrank lever 278 which is pivotally mounted on a shaft 280 and has a second arm member 282 which extends approximately horizontally under the head 264 of the screw 262. It will readily be understood from FIGURE 6 that when air is supplied to cylinder 270 so as to extend the piston 272, the bellcrank lever 278 will be pivoted in a counterclockwise direction about shaft 280 so as to raise the actuator rod 232 and move the holding pawl 220 to its operative position, and when air is supplied to the cylinder 270 to retract the piston 272, the compression spring 250 will be permitted to move the rod 232 downwardly so as to release the holding pawl 220. FIGURES 1, 14 and 16 show a similar bellcrank member 284 which is pivoted on a shaft 286 and has a generally horizontally extending arm 288 for cooperating with the screw head 268 which extends downwardly from the actuator rod 244 for the holding pawl 222. The bellcrank lever 284 is provided with a downwardly depending arm 290 which is actuated by a link 292 and a corresponding air cylinder 293 and piston 295 in the manner above described. The foregoing bellcrank arrangements are also illustrated in FIGURES 18 and 19, the rods 232 and 244 being shown in their upper positions in FIGURE 18 wherein the holding pawls 220 and 222 are operative, and being shown in their lower positions in FIGURE 19 wherein the holding pawls are inoperative.

Strap straightening mechanism

Once a predetermined amount of the strap S has been fed out around a package or object to be bound and the free end of the strap has been brought back under the package and positioned against the stops 204 and 205 as indicated in FIGURE 14, then as described above the holding pawls 220 and 222 are actuated to bear down upon and hold the upper layer or free end of the strap. Thereafter, the drive motor 114 is driven in the reverse direction so as to rotate the strap feed roller 78 in a counterclockwise direction as viewed in FIGURES 8 and 9 and thereby pull the strap closely around the object being bound. Other mechanism, to be described later herein, is provided to produce a predetermined high tension in the strap.

While the strap is being fed in the reverse direction as described above, mechanism is operated to straighten the strap so as to eliminate any tendency for the same to bend or curl when it is fed out of the machine, except insofar as guide members may be provided for such purpose. Accordingly, there is provided as shown in FIGURE 14 a retainer block 300 which has a pair of rollers 302 and 304 disposed in arcuate recesses in the upper surface thereof. The rollers 302 and 304 are arranged horizontally and transversely to the direction of travel of the strap, and they are only partially recessed in the retainer block 300 and thus are adapted to engage the underside of the strap in the area to the left of the strap cutter 202 as viewed in FIGURE 14. Immediately above the rollers 302 and 304 there is a specially formed strap guide member 306 which has a pair of arcuate recesses 308 and 310 formed therein in alignment with the rollers 302 and 304. When the retainer 300 is in its lowered position, the rollers 302 and 304 do not press against the strap S, and the straightening mechanism is inoperative. However, when the retainer 300 is moved upwardly to a position approximately as shown in FIGURE 14, the rollers 302 and 304 force the strap upwardly and partially into the recesses 308 and 310, and when the strap is fed through the straightening mechanism with the latter in operative position, the strap is straightened, and any tendency for the strap to curl up or bend when it later is fed from the machine is eliminated.

The retainer block 300 is disposed in a cutout portion in a plate member 312, the cutout portion being defined by vertical front and rear walls 314 and 316, a bottom wall 318, and a generally semi-circular recess 320 formed in the bottom wall. The block 300 is vertically slidable within the cutout portion between an upper operative position as shown in FIGURE 14 and a lowered position where it rests on the bottom wall 318 of the cutout. FIGURE 18 further shows a pair of side wall members 322 and 324 which guide the block 300 during its vertical travel. As shown in FIGURE 14, a shaft 326 extends through the recess 320 in the bottom wall of the cutout portion, and the shaft has an eccentric portion 328 thereon which is disposed in the recess 320 immediately beneath the block 300. It will thus be understood that the block 300 is raised and lowered by the eccentric 328 by simply rotating the shaft 326 a slight amount.

Referring again to FIGURE 18, it will be seen that the shaft 326 extends into each of the side walls 322 and 324, and the eccentric 328 is disposed therebetween beneath the block 300, the roller 304 being shown projecting above the top of the block at the underside of the the strap. FIGURES 6, 13 and 18 show a lever arm 330 which is mounted on the shaft 326, and a pin 332 is mounted on the lever 330 and extends laterally outwardly therefrom in offset relation to the shaft 326. Beneath the end of the pin 332 there is disposed a piston 334 which is vertically movable by an air cylinder 336. It will now be understood that when the air cylinder 336 is operated to raise the piston 334, the pin 332 will be raised so as to rotate the crank or lever 330 in a clockwise direction as viewed in FIGURE 6, thereby rotating the eccentric 328 to the position of FIGURE 14 whereby the block 300 and rollers 302 and 304 are raised to operative positions. When the piston 334 is lowered, a torsion spring 338 (see FIGURE 13) acts on the pin 332 to return the crank 330 and eccentric 328 to their normal positions and permit the block 300 to return to its lowered inoperative position. An adjustable stop pin 340 (see FIGURES 6 and 13) limits the amount by which the crank 330 and shaft 326 are rotated.

It is important to note that the straightening mechanism including the rollers 302 and 304 is inoperative when the strap is being fed forwardly through the machine by the feed roller 78. The air cylinder 336 is operated to raise the rollers 302 and 304 to operative positions at the time when the feed roller 78 is driven in a reverse direction to pull the strap closely around the object being bound. Consequently, it is the portion of the strap which is drawn back into the machine which is straightened, and of course it is that same portion which will be initially fed out of the machine during the next succeeding strapping operation. Thus, when strap S is fed out of the machine and around an object to be bound, a substantial leading portion of the strap thus supplied will have been straightened during the previous strapping operation. Strap which has been straightened as described herein will function more efficiently since it will not tend to bend or curl up of its own accord, and it will properly follow any guide structure which is provided to lead the strap around a package or the like. This is important in a strapping machine of the type disclosed herein, and is perhaps even more important in fully automatic machines where no manual operation is required to position the free end of the strap.

*Strap tensioning mechanism*

As shown in FIGURES 1 and 8, strap being fed into the machine passes through the tensioning mechanism indicated generally at 62 before it passes between the feed roller 78 and back-up roller 80. The function of the tensioning mechanism is to provide a predetermined high tension to the strap which has been applied around an object to be bound. That is, the roller 78 is driven in a reverse direction to take the slack out of the strap and draw it closely around the object being bound, but the roller itself is not adapted to produce substantial tension in the strap, and the motor 114 is not intended to perform such a function. Accordingly, after the roller 78 has been driven in the reverse direction an amount sufficient to take out the slack, the air cylinder 64 is operated to actuate the tensioning mechanism 62 and thereby take up the strap further. The tensioning mechanism of the present invention is designed to provide unlimited take-up of the strap, as will be made clearer from the following description.

Figure 12:
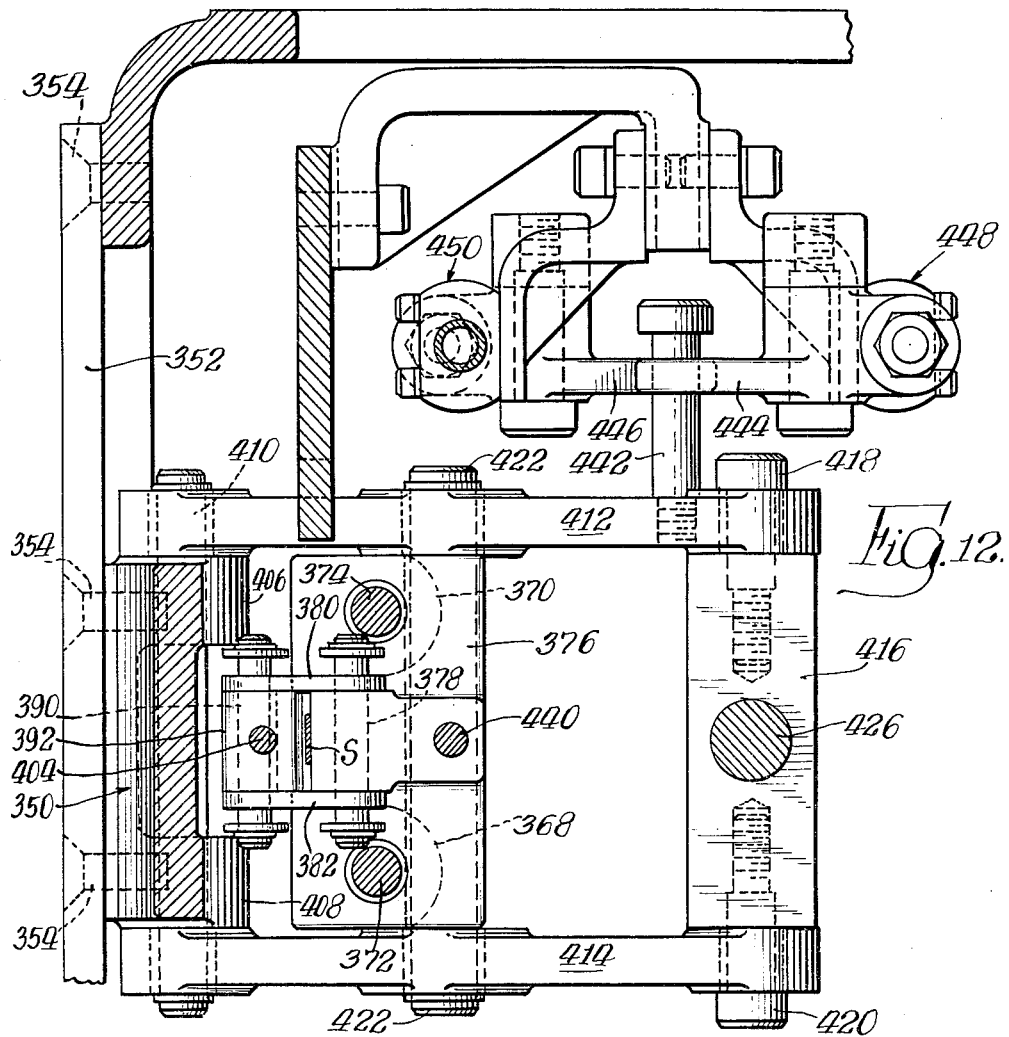
FIGURE 12 is a fragmentary horizontal sectional view taken substantially along the line 12—12 of FIGURE 10.

FIGURES 8 and 10 show a bracket member 350 which is secured to a portion of the framework by a mounting plate 352 and a plurality of screws 354. The bracket 350 has an upwardly extending arm 356 and a downwardly extending arm 358. At the upper end of the bracket arm 356 there is a horizontally extending portion 360 which is bifurcated so as to form a pair of upper horizontal arm members 362 and 364 as best shown in FIGURE 11. In a similar fashion, at the lower end of the arm 358 there is a horizontally extending portion 366 which is bifurcated so as to form a pair of lower horizontal arm members 368 and 370 as best shown in FIGURE 12. A first vertical guide rod 372 extends between the upper horizontal arm 362 and the lower horizontal arm 368, and a second vertical guide rod 374 (see FIGURES 10, 11 and 12) extends between the upper horizontal arm 364 and the lower horizontal arm 370. Accordingly, the two vertical guide rods 372 and 374 are fixedly mounted by the bracket member 350.

Figure 10A:
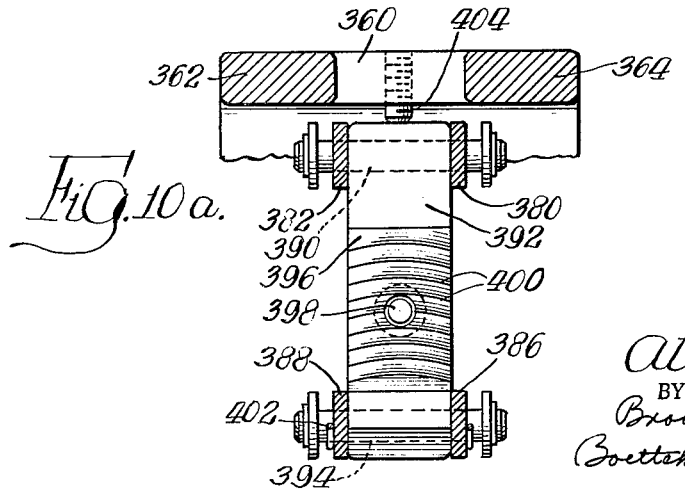
FIGURE 10a is a fragmentary vertical sectional view taken substantially along the line 10a—10a of FIGURE 10.

A base member 376 is provided with a pair of vertical bores to receive the guide rods 372 and 374, and the base is mounted on the guide rods for vertical movement thereon. The base 376 carries an upper horizontal pin 378 on which a pair of upper links 380 and 382 are mounted, and a lower horizontal pin 384 on which a pair of lower links 386 and 388 are mounted. The opposite ends of the upper links 380 and 382 carry a cross pin 390 which extends through a bore in the upper end of a gripper retainer 392 which is disposed between the two link members. Similarly, the opposite ends of the lower links 386 and 388 carry a cross pin 394 which extends through a bore in the lower end of the gripper retainer 392 which is disposed between the two lower link members. As shown in FIGURE 10, the gripper retainer 392 is provided with a generally rectangular recess in which a gripper 396 is disposed and held by a screw 398. The gripper 396 is provided with a plurality of teeth 400 (see also FIGURE 10a) which extend somewhat downwardly so as to be operative to grip the strap S only on the downstroke of the gripper. It will be understood from the foregoing that the above-described structure comprises a base member 376, four links 380, 382, 386 and 388, and a gripper retainer 392 which together form a parallelogram arrangement, whereby upon pivoting of the four links, the gripper 396 may be moved toward and away from the opposed side face of the base member 376 while remaining substantially parallel thereto in all positions.

A torsion spring 402 is mounted on the lower cross pin 384 (see FIGURES 10 and 11) and is associated with the gripper retainer 392 so as to bias the latter upwardly, and a stop screw 404 is mounted in the upper horizontal bracket arm 360 for engaging the upper end of the gripper retainer and holding it downwardly relative to the base 376 when the latter is in its upper position. Thus, when the base member 376 is moved upwardly on the guide rods 372 and 374 to its normal upper position as shown in FIGURE 10, the screw 404 will engage the top of the retainer 392 and move it downwardly an amount sufficient to cause the gripper 396 to be spaced from the adjacent face of the base 376, whereby the gripper will be inoperative and strap S can be fed freely between the gripper and the base member. On the other hand, when the base member 376 is moved downwardly on the guide rods 372 and 374, the spring 402 will cause the gripper retainer 392 to pivot upwardly with the four link members 380, 382, 386 and 388 whereby the gripper 396 will press the strap against the face of the base member. In the latter position as shown in FIGURE 9, the gripper 396 will operatively grip the strap and will carry the strap downwardly with it so as to tension the strap around the object to be bound.

Still referring to FIGURES 10, 11 and 12, the bracket member 350 is provided with a pair of spaced lugs 406 and 408 which support the opposite ends of a rod 410, and a pair of lever arms 412 and 414 are pivotally mounted on corresponding ends of the rod 410. The opposite ends of the lever arms 412 and 414 are interconnected by a cross member 416 (see FIGURE 12) which is connected to the arms by a pair of screws 418 and 420, whereby the arms 412 and 414 are required to pivot together about the axis of the pin 410. Intermediate the pin 410 and the cross member 416, the lever arms 412 and 414 also carry a cross rod 422 which as best shown in FIGURE 10 extends through a generally semi-circular slot 424 formed in the side of the base member 376. Accordingly, when the arms 412 and 414 are pivoted about the pivot pin 410, they carry the cross rod 422 with them, and through its connection with the base member 376 the rod 422 moves the base member vertically on the guide rods 372 and 374. The movement of the lever arms 412 and 414 is effected by the air cylinder 64 which operates a piston member 426 which is operatively connected with the cross member 416.

A second holding gripper member 430 (see FIGURE 10) is pivotally mounted on a fixed pin 432 and is biased in a clockwise direction by a torsion spring 434. The gripper 430 is provided with a plurality of teeth 436 which engage the strap S and press it against a fixed guide member 438 when the holding gripper is moved to its clockwise position by the spring 434, the gripper being released when pivoted in a counterclockwise direction. As can be seen from FIGURE 10, the gripper 430 is disposed above the main base member 376, and a vertical screw 440 is threaded into the upper end of the base 376 so as to project upwardly under the end of the holding gripper 430, whereby when the base 376 is moved to its normal upper position as shown in FIGURE 10, the upper end of the screw 440 will engage the underside of the holding gripper 430 and pivot the latter to its counterclockwise or inoperative position. When the base member 376 is subsequently moved downwardly as shown in FIGURE 9, the spring 434 will pivot the gripper 430 clockwise to its operative position wherein it will grip the strap S and prevent the latter from moving upwardly. It will be understood that the gripper 430 will always permit downward movement of the strap S even though it is in its operative position.

FIGURE 12 shows an actuating pin 442 which is threaded into the lever arm 412 and extends horizontally therefrom between an upper control lever 444 and a lower control lever 446. When the air cylinder 64 is operated to move the piston 426 to its extreme upper position, the pin 442 engages and pivots the upper control lever 444 in a clockwise direction as shown in FIGURE 8 to actuate a corresponding valve 448, and when the piston 426 is moved to its extreme lower position the pin 442 engages the lower control lever 446 and pivots the same in a clockwise direction to actuate a corresponding valve 450. As will be described more fully later herein, the valves 448 and 450 control the direction of flow of air to the cylinder 64, whereby when the piston 426 reaches the end of its stroke in one direction, it will automatically be actuated in the opposite direction, and will continue to reciprocate up and down as many times as is necessary until the desired predetermined tension is produced in the strap S.

In operation, the tensioning mechanism is normally positioned as shown in FIGURE 10 wherein the holding gripper 430 is held in an inoperative position by the pin 440, and the gripper retainer 392 and gripper 396 are held in inoperative positions by the screw 404, whereby strap S may be freely fed through the machine by the feed roller 78 as earlier described. When it is desired to tension the strap, the cylinder 64 is supplied with air to move the piston 426 downwardly and thereby move the base member 376 and components thereon downwardly as shown in FIGURE 9. When the base member 376 moves downwardly, the pin 440 moves away from the holding gripper 430 to render the latter operative, and the gripper retainer 392 is moved away from the screw 404 to render the gripper 396 operative. Thus, as the base 376 and gripper 396 move downwardly, the strap S is firmly gripped and pulled downwardly therewith so as to apply tension to the strap.

If the predetermined desired strap tension is obtained during the first downward stroke, then the piston 426 will remain in its downward position and the sealing operation will be initiated. However, assuming further tension is desired, the base member 376 will then be moved upwardly, and during the upward stroke the downwardly inclined teeth 400 on the gripper 396 will slide along the strap S without gripping the same. Also, it is important to note that during the upward stroke of the gripper 396, the strap is being held by the holding gripper 430 so as to retain the tension previously applied to the strap. When the base member 376 reaches its uppermost position, the control lever 444 will be actuated to initiate a further downward stroke during which further tension is applied to the strap. Thus, the gripper 396 can be reciprocated any number of times so as to provide unlimited take-up of the strap which is prevented from moving upwardly by the holding gripper 430. It will be noted that at the upper end of the stroke of the gripper 396 there will be a brief moment when both the gripper 396 and the holding gripper 430 are released, and while a small amount of strap tension can be lost at such moment, the next downward stroke of the base member 376 is initiated with sufficient speed as to minimize the loss of tension at the upper end of the stroke.

*Sealing mechanism*

FIGURE 1 shows the sealing cylinder 76 together with an associated piston 500 which is raised and lowered by supplying air under pressure to the cylinder, and as shown in FIGURE 14 the upper end of the piston 500 is connected to the clevis 168 by a pin 502, whereby the piston will move the clevis vertically between the side plate members 164 and 166. Thus, the side plates 164 and 166 guide the clevis 168, and as previously described the clevis has a vertical rib member 170 which projects into the vertical slot 162 formed in the side wall 164 and also serves to guide the clevis during its vertical travel.

FIGURE 19 shows a pair of pins 504 and 506 which are carried by the upper end of the clevis 168, and it further shows a first link 508 which has one end connected to the pin 504 and a second link 510 which has one end connected to the pin 506. The other end of the link 508 carries a pin 512 on which a cam follower roller 514 is mounted, and the other end of the link 510 carries a pin 516 on which a cam follower roller 518 is mounted. The roller 514 is adapted to ride on an inner cam surface 520 of a fixedly mounted cam plate 522, while the roller 518 is adapted to ride on an inner cam surface 524 of a fixedly mounted cam plate 526. Referring to FIGURE 15, it will be seen that the guide rail or cam plate 522 is secured to the side plate 166 by a plurality of screws 528, and the roller 514 sits on one end of the pin 512 so as to be immediately adjacent the side plate 166 with its surface riding on the cam surface 520. In addition, a second roller 530 is mounted on the opposite end of the pin 512 adjacent the opposite side plate 164, and the roller 530 rides on a cam surface 532 of a guide rail 534 which is fixedly secured to the side plate 164 by a plurality of screws 536, the cam surface 532 being substantially identical to the cam surface 520.

Still referring to FIGURE 15, the guide rail or cam plate 526 is secured to the side plate 166 by a plurality of screws 538, and the roller 518 sits on one of the pin 516 so as to be imediately adjacent the side plate 166 with its surface riding on the cam surface 524. In addition, a second roller 540 is mounted on the opposite end of the pin 516 adjacent the opposite side plate 164, and the roller 540 rides on a cam surface 542 of a guide rail 544 which is fixedly secured to the side plate 164 by a plurality of screws 546, the cam surface 542 being substantially identical to the cam surface 524. FIGURE 15 further shows a pair of crimper jaws 550 and 552 which are mounted on the pin 512 and are disposed adjacent the upper end of the link 508 on opposite sides thereof, and a second pair of crimper jaws 554 and 556 which are mounted on the pin 516 and disposed adjacent the upper end of the link 510 on opposite sides thereof.

As shown in FIGURES 19 and 20, the upper ends of the crimper jaw members carry a pair of cross pins 558 and 560. Thus, the cross pin 558 is supported by the crimper jaws 550 and 552, while the cross pin 560 is supported by the crimper jaws 554 and 556, and the cross pins 558 and 560 serve to support other components of the sealing mechanism as will now be described. With reference to FIGURE 17, it will be seen that the cross pin 558 extends through the crimper jaw members 550 and 552 and into vertical slots in the side plates 164 and 166. Thus, one end of the pin 558 extends into a vertical slot 562 in the side plate 164, while the other end extends into a vertical slot 564 in the side plate 166. Similarly, one end of the cross pin 560 extends into a vertical slot 566 in the side plate 164, while the other end extends into a vertical slot 568 in the side plate 166. FIGURE 19 provides a showing of the vertical length of the slots 562 and 566 in the side plate 164, and as shown in FIGURE 19 the cross pins 558 and 560 are adjacent the lower ends of the slots. It will of course be understood that the length of the vertical slots 562, 564, 566 and 568 controls the amount by which the cross pins 558 and 560 can be moved vertically when the clevis 168 is moved vertically by the piston 500.

Hereinabove there has been described the manner in which the piston 500 actuates the clevis 168 vertically between the side plates 164 and 166, the manner in which the clevis 168 supports the two links 508 and 510, the four rollers 514, 518, 530 and 540 which are carried on cross pins 512 and 516 mounted in the upper ends of the links 508 and 510 and which ride on corresponding guide rails 522, 526, 534 and 544, the four crimper jaw members 550, 552, 554 and 556 which as shown in FIGURES 19 and 20 extend upwardly from and are supported on the cross pins 512 and 516, and the two cross pins 558 and 560 which are supported by the four crimper jaw members. Various other components which will now be described are supported on the cross pins 558 and 560 for vertical movement therewith as the pins travel vertically in the slots provided therefor in the side plates 164 and 166. Thus, referring first to FIGURE 17, a spacer member 572 is mounted on the two cross pins 558 and 560 and is disposed immediately adjacent the side plate 166. It will be seen that the spacer 572 has a vertical rib 574 which rides in a corresponding recess 576 formed in the inner face of the side plate 166. In addition, a punch block member 578 is mounted on the two cross pins 558 and 560 and is disposed immediately between the pair of crimper jaws 550 and 554 on one side thereof and the pair of crimper jaws 552 and 556 on the opposite side thereof. A further component comprises the seal and strap cutting knife 580 which is also mounted on the cross pins 558 and 560. However, in contrast with the other components which are carried on the pins 558 and 560, the cutting knife 580 is provided with a pair of short vertical slots 582 and 584, as shown for example in FIGURES 2 and 20, whereby the knife is capable of vertical movement relative to the cross pins.

In the positions of the components as shown in FIGURE 20, it will be seen that the knife 580 is provided with a pair of depending leg members 586 and 588 which rest on the top of the rollers 530 and 540 so as to be supported thereby, and it will thus be understood that the knife is not vertically supported by the cross pins 558 and 560 in the position shown. FIGURE 2 shows the shape of the cutting knife 580 which has a somewhat arcuate upper cutting surface 590 and a bottom surface 592 which conforms to the shape of the upper end of the clevis 168 for a purpose to be described hereinafter. As shown in FIGURE 20, the upper end of the punch block 578 includes a horizontal central portion 594 and a pair of inclined surfaces 596 and 598 on each side thereof. As will be described further hereinafter, the crimper jaw members 550, 552, 554 and 556 bend the side walls 36 of a seal 32 down on top of overlapped strap portions as shown in FIGURE 3, and the punch block 578 is positioned immediately beneath the seal and in between the two pairs of crimper jaw members so as to support the portions shown at 44 in FIGURE 3. That is, the inclined surfaces 596 and 598 on the punch block 578 support portions 44 during operation of the crimper jaws, thereby producing the punched out portions 44 which prevent the joint from coming apart.

Relative to the cutting of a seal 32 from the strip 30 of connected seals, and the cutting of the strap supply from strap which has been applied to a package, both such operations are performed by the knife member 580. FIGURE 14 shows a fixed seal cutter member 600, and as viewed in the drawing the lower right hand edge of the cutter 600 cooperates with the upper left hand edge of the knife 580 to cut a seal 32 from the seal supply strip 30. In addition, after knife has been moved further upwardly proximate the upper end of its stroke, the lower right hand edge of the fixed strap cutter 202 cooperates with the upper left hand edge of the knife 580 to cut the lower layer of strap. FIGURE 14 further shows a seal hold down member 602 which is pivotally mounted on a pin 604 and biased in a counterclockwise direction by a spring 606 so as to assist in holding a seal which has been fed into an operative position as shown in dotted lines in FIGURE 14. The spring loaded hold down member is subsequently pushed out of the way by the spacer 572 during the sealing operation as shown in FIGURES 16 and 17.

In operation, the initial position of the sealing mechanism is as shown in FIGURE 19 with the piston 500 at the lower end of its stroke. In such position, the rollers 518 and 540 are engaged with a straight vertical portion 608 of the cam surface 524, while the rollers 514 and 530 are engaged with a straight vertical portion 610 of the cam surface 520. In addition, the crimper jaws 550, 552, 554 and 556, the knife 580 and the punch block 578 are all disposed beneath the position where a seal 32 will be fed into operative position (see FIGURE 14) so as to be held by the seal holding member 602. After the proper tension has been applied to the strap on the package by the tensioning mechanism 62 described earlier herein, a sealing operation is initiated by actuating the cylinder 76 to raise the piston 500. During the initial upward movement of the clevis 168, the rib 170 on the clevis engages the seal feed cam 154 so as to cause the strip 30 of seals to be advanced thereby positioning the leading seal 32 in the operative position shown in dotted lines in FIGURE 14.

During the initial upward movement of the four crimper jaws 550, 552, 554 and 556, the rollers 518 and 540 ride on the vertical cam surface portion 608, and the rollers 514 and 530 ride on the vertical cam surface portion 610, whereby the jaws remain in their open positions as shown in FIGURE 19 wherein they are adapted to move up over the leading seal 32 which is thus received therebetween. As the crimper jaws reach the leading seal, the rollers 518 and 540 ride outwardly on an inclined cam surface portion 612, while the rollers 514 and 530 ride outwardly on an inclined cam surface portion 614, thereby causing the crimper jaws to pivot about their respective cross pins 558 and 560 toward partially closed positions as shown in FIGURE 20. In the position of FIGURE 20, the crimper jaws 550, 552, 554 and 556 take hold of the seal and support it so that it will be carried upwardly by the jaws. With reference to the crimper jaw 550 of FIGURE 20, it will be seen that at its upper end the jaw has a substantially flat supporting surface 616 which is approximately horizontal in the position illustrated and which is disposed under the bottom portion 34 of the seal to support the same. In addition, the crimper jaw has a projecting portion 618 which extends over the top of the side wall 36 of the seal to provide further support and in effect prevent the escape of the seal. More specifically, the jaw 550 has a notch defined by approximately perpendicular wall portions 620 and 622 which receive the upper end of the side wall 36. The other three crimper jaws 552, 554 and 556 are substantially identical in their configuration with the jaw 550 and cooperate with the seal in the manner described above.

In the position of the components illustrated in FIGURE 20, the upper cutting edge of the knife 580 is immediately beneath the bottom wall 34 of the seal adjacent one of the connecting portions 38 (see FIGURE 2), and as the piston 500 continues to move the sealing mechanism upwardly, the knife 580 cooperates with the fixed seal cutter 600 to cut the leading seal from the supply strip 30. In addition, the four crimper jaws 550, 552, 554 and 556 continue to close somewhat further as the rollers 518, 540, 514 and 530 roll upwardly along the corresponding inclined cam surfaces 612 and 614, the seal being of course held and carried upwardly by the crimper jaws. During the cutting of the seal, the knife 580 is forced upwardly by the rollers 530 and 540 which act on the downwardly depending leg portions 586 and 588 of the knife. As the piston 500 and clevis 168 continue their upward travel, the rollers 518 and 540 reach a second straight vertical cam surface portion 624, and the rollers 514 and 530 reach a second straight vertical cam surface portion 626. As the rollers move up along these cam surfaces, the four crimper jaws 550, 552, 554 and 556 continue to carry the seal 32 upwardly, but the jaws do not close further upon the seal, and the side walls 36 of the seal are still open sufficiently for the seal to be moved up over the overlapped strap portions S as indicated in FIGURE 2, such positioning of the seal being preparatory to the actual crimping of the seal to produce a joint as illustrated in FIGURE 3.

Upon further upward movement of the clevis 168, the lower ends of the links 508 and 510 are pivoted inwardly, while the rollers 514, 530, 518, and 540 are moved outwardly, as shown in FIGURES 22 and 23, whereby the links 508 and 510 are caused to assume horizontal positions. In the latter positions of the components, the crimper jaws 550, 552, 554 and 556 have been pivoted to their fully closed positions, and the pins 558 and 560 have reached the upper ends of the vertical slots 562, 564, 566 and 568 in the side plate members. FIGURES 22 and 23 show that the four pins 504, 506, 512 and 516 have been moved to positions of horizontal alignment, and in such positions of the components the crimping of the seal has been completed, the four crimping jaws having co-operated with the punch block 578, and in particular the inclined surfaces 596 and 598 on the top of the punch block, in order to bend the sides 36 of the seal down on the top of the overlapped strap portions S, and punch out the portions 44 to form a completed joint as illustrated in FIGURE 3.

While the cross pins 558 and 560 cannot move upwardly any further after the crimping operation described above has been completed, the piston 500 does move the clevis 168 further upwardly to an extreme upper position as illustrated in FIGURES 24 and 25, and during this movement the upper end of the clevis 168 is engaged against the underside of the knife 580 so that the clevis itself forces the knife upwardly to cut the lower layer of strap and thus separate the strap supply from the strap which has been applied to a package. As best shown in FIGURE 25, the upper left hand edge of the knife 580 cooperates with the lower right hand edge of the fixed strap cutter 202 in order to cut the lower layer of strap. It is also important to understand that the knife is moved still further upwardly after the cutting of the strap to an extreme upper position approximately as shown in FIGURE 25, whereby the knife 580 presses upwardly on the cut end of the strap to bend it against the upper layer of strap. Thus, prior to the strap cutting operation the upper and lower layers of strap were vertically spaced apart by the strap cutter 202, and without the final bending operation described above, the cut end of the strap tends to project away from the upper strap layer so as to constitute a safety hazard. Such a hazard is eliminated by the final upward stroke of the knife as described above.

It is important to note that during the final upward movement of the knife, the upward movement of the clevis 168 moves the pins 504 and 506 upwardly thus inclining the links 508 and 510 somewhat (see FIGURE 24) and causing the pins 512 and 516 to be pulled inwardly a slight amount. These movements will pivot the crimper jaws 550, 552, 554 and 556 open slightly, thereby permitting the final upward movement of the knife 580 to the position of FIGURE 25 without placing undue load on the crimper jaws. During such operation, the holding pawls 220 and 222 which are still operative will be forced upwardly a small amount, but without causing any damage thereto. FIGURE 6 shows a pin 630 which moves upwardly with the clevis 168 and engages a pivotally mounted control lever 632 so as to actuate a valve 634 when the clevis has completed its stroke, thereby initiating a resetting operation as will be explained more fully hereinbelow in connection with the air control system.

*Air control system*

FIGURE 26 shows a main air supply line 650 which continuously supplies air under pressure to a supply manifold 652. The supply manifold 652 supplies air through eight supply lines as indicated at 654, 656, 658, 660, 662, 664, 666 and 668. The supply line 654 leads to the normally closed valve 450 which is automatically opened when the tension cylinder 64 reaches the bottom of its stroke. The supply line 656 leads to the inlet of a valve 659, the supply line 658 leads to a manually operable reset valve 670, and the supply line 660 leads to a manually operable feed valve 672. The supply line 662 supplies air to a valve 674, the supply line 664 supplies air to a valve 676, and the supply line 666 supplies air to the valve 634 which is an automatic reset valve and is opened automatically when the sealing cylinder 76 reaches the upper end of its stroke. The supply line 668 leads to a manually operable sealing valve 678.

In order to initiate the operation of the strapping machine, the feed valve 672 is manually opened, the valve being a "Versa" valve of the type which is opened momentarily by pressing a button. When the valve 672 is opened, a line 680 between the valve 672 and the valve 674 is charged with air, and then the valve 672 is closed. The air pressure in the line 680 moves the valve 674 to its right hand position to open the left port thereof and cause air to be supplied from line 662 through the valve and then through a line 682 to the motor 114 to drive the motor forwardly and thereby feed strap S out of the machine as described earlier herein.

The valve 674 is of a type which is biased by a spring or the like to neutral position, and thus it will remain in its right hand position only as long as there is sufficient pressure in the line 680. The pressure in the closed line 680 is gradually reduced due to an adjustable bleed-off or flow control valve 684 which permits air in the line 680 to escape therefrom at a predetermined controlled rate of flow. Once sufficient air has escaped from the line 680, the valve 674 will return to its neutral position, and the motor 114 will no longer be driven forwardly, whereby the feeding out of the strap S will be terminated. It is important to understand from the foregoing that the amount of strap S which is fed out of the machine can be automatically controlled by adjusting the flow control valve 684 which in the embodiment described herein acts as a timing device and controls the length of time which the motor 114 will be driven forwardly to feed out strap. The valve 684 is closed down in order to increase the amount of strap S which is fed out, and the valve is opened up to decrease the amount of strap which is fed out.

Once the desired amount of strap S has been fed out, the free end of the strap is manually positioned under the package and against the stops 204 and 205 as described earlier herein, and thereafter the button actuated sealing valve 678 is manually pressed open so as to supply air from the line 668 through a line 686 to the left hand side of the valve 659 so as to move the latter to its right hand position and open the left hand port, thereby causing air to be supplied from the line 656 through a line 688 to a reverse manifold member 690. When the reverse manifold member 690 is thus charged with air under pressure, several operations are effected simultaneously. Thus, air is supplied through lines 692 and 694 to the cylinders 293 and 270 which thereby render the holding pawls 220 and 222 operative to hold the free end of the strap S, and air is supplied through a line 696 to the cylinder 336 to move the straightening rollers 302 and 304 to operative positions. In addition, air is supplied through a line 698 to the right hand side of the motor 114 so as to drive the feed roller 78 in the reverse direction and thereby draw the strap S closely around the object to be bound.

Air is also supplied through a line 700 to a first sequence valve 702 which is a "Devilbiss" valve of a type which will open only when acted upon by a pressure of predetermined magnitude. The valve 702 is regulated so that it will not open at the normal pressure produced in the reverse manifold 690 at this stage of the cycle. However, once the motor 114 has driven the feed roller 78 in the reverse direction an amount sufficient to draw the strap S closely around the object being bound, the motor will stall and create a back pressure through the line 698 so as to increase the pressure in the reverse manifold 690 by approximately 5 p.s.i., thereby effecting the actuation of the first sequence valve 702. Incidentally, it will be noted that when the motor 114 is driven forwardly it is exhausted at the reverse manifold 690, and when it is driven in reverse it is exhausted at the valve 674.

Once the sequence valve 702 has in effect sensed that the strap S has been drawn closely around the package, and the valve thus opens, air is supplied from line 700 through a line 704 to the valve 448 which is being held open because the tension cylinder 64 is at the upper end of its stroke. Thus, air is supplied through the valve 448 and through a line 706 to the right hand side of the valve 676, thereby moving the latter to its left hand position and opening the right port thereof. Upon opening the right port of the valve 676, air is supplied from line 664 through the valve 676 and through lines 708 and 710 to the top of the tension cylinder 64 to actuate the latter downwardly and thereby effect tensioning of the strap S. Air is also supplied from line 708 through a line 712 to a second sequence valve 714 which is set to open at a predetermined pressure corresponding to the desired tension in the strap S.

Assuming the first downward operative stroke of the tensioning cylinder 64 is not sufficient to produce the desired tension in the strap, the sequence valve 714 will not open. When the cylinder 64 reaches the lower end of its stroke, the control valve 450 will automatically be opened so as to cause air to be supplied from the line 654 through valve 450 and through a line 716 to the left hand side of the valve 676, the air being blocked from passing through a line 718 due to the presence of a one-way check valve 720 therein. When air is thus supplied to the left hand side of the valve 676, the valve is moved to its right hand position to open the left port therein, thus causing air to be supplied from line 664 through the valve and through a line 722 to the lower end of the tension cylinder 64 to cause the latter to return to its uppermost position. It will be understood that as used herein the valve 676 is always in either its left hand position with the right port open, or in its right hand position with the left port open, whereby air is always supplied to one or the other end of the cylinder 64.

In the manner described hereinabove, the tension cylinder 64 will continue to reciprocate up and down an unlimited number of times until the desired tension in the strap S is obtained, thus providing for unlimited take-up of the strap. When the cylinder 64 during its operative downstroke develops the desired tension in the strap, the pressure developed in the circuit including lines 708, 710 and 712 will actuate the second sequence valve 714, thereby causing air to be supplied through the valve and through a line 724 to the right hand side of the valve 674 so as to move the latter to its left hand position and open the right port therein. When the right port of valve 674 is opened, air is supplied from line 662 through the valve and through a line 726 to the lower end of the sealing cylinder 76 so as to initiate the sealing operation. It is important to understand that the second sequence valve 714 is adjustable and is regulated in accordance with the desired tension in the strap S, and once the desired tension is obtained, this is sensed by the sequence valve 714 which opens and thereby initiates the sealing operation. In some instances the desired tension in the strap may be obtained on the first operative downstroke of the tension cylinder 64, whereas in other instances, particularly where the package being bound is somewhat compressible, it may be necessary for the cylinder 64 to reciprocate several times before the desired strap tension is obtained. In any case, the present structure is designed to provide the desired tension automatically and to provide unlimited take-up of the strap. It should further be understood that when the sequence valve 714 opens it diverts the air supply line 708 and conducts it to the valve 674, whereby the movement of the tension mechanism is stopped and the later simply holds the strap to maintain the tension therein during the sealing operation.

When the sealing cylinder 76 reaches the upper end of its stroke at the completion of the sealing and strap cutting operation, the normally closed control valve or automatic reset valve 634 is opened automatically, whereby air is supplied from the line 666 through the valve and through a line 728 to a point from which it is distributed to reset various components of the strapping machine. Thus, air at point 730 is conducted to the right hand side of valve 659 to move the valve to its left hand position and open the right port thereof to supply air through a line 732 to the top of the sealing cylinder 76 to return the latter to its normal lower position, while at the same time shutting off the supply of air to the reverse manifold 690, thereby causing the holding pawls 220 and 222 and the straightening rollers 302 and 304 to be moved to inoperative positions. Air is also supplied through a line 734 through the one-way check valve 720 to the left hand side of valve 676 to move the latter to its right hand position and open the left port thereof thus supplying air through line 722 to the lower end of the tension cylinder 64 so as to raise the latter to its normal upper position. It will further be understood that the valve 674 is automatically reset to its neutral position since it is biased to that position and will return thereto when the right hand port of valve 676 is closed as described above, since air will no longer be supplied to the second sequence valve 714 and thus air will no longer be conducted through line 724 to the right hand side of the valve 674. The various resetting operations described above can be effected at any desired time by actuating the manual reset valve 670 which causes air to be supplied through a line 736 to the above-mentioned air distributing point 730.

The manual reset button 670, the manual feed button 672, and the manual seal button 678 are all shown in their actual positions on the machine in FIGURE 7. FIGURE 8 shows the supply manifold 652, the reverse manifold 690, the three valves 676, 659 and 674, and the two control valves 448 and 450 which control the tension cylinder 64. FIGURE 6 shows the automatic reset valve 634.

*Summary of overall operation*

In order to initiate a strapping operation, the feed button 672 is manually depressed, thereby causing the motor 114 to drive the strap feed roller 78 forwardly to feed strap out of the machine and substantially around an object to be bound as indicated in FIGURE 1, the amount of strap which is fed out being controlled by the flow control valve 684 which functions as a timer. Once the strap has been fed out, the free end of the strap is manually inserted under the package as in FIGURE 1 and brought against the stop members 204 and 205 (see FIGURES 13 and 14), the free end or upper layer of strap being vertically separated from the strap supply or lower layer of strap by the fixed strap cutter 202 as shown in FIGURE 14.

With the free end of the strap S positioned against the stops 204 and 205, the seal button 678 is manually depressed, causing air to be supplied to the reverse manifold 690. The manifold 690 supplies air to the cylinders 270 and 293 which actuate the holding pawls 220 and 222 to operative positions. Thus, as viewed in FIGURE 19, the holding pawl 220 is pivoted clockwise and the holding pawl 222 is pivoted counterclockwise, causing the long finger portions 226 and 238 to bear downwardly on the upper layer of strap adjacent where the latter is supported on the strap cutter 202. Accordingly, with reference to FIGURE 14, the upper layer of strap above the cutter 202 is firmly held, whereas the lower layer of strap beneath the cutter 202 remains free. Air is also supplied from the reverse manifold 690 to the cylinder 336 so as to rotate the eccentric 328 (see FIGURES 14 and 16) and raise the retainer block 300, whereby the straightening rollers 302 and 304 are moved upwardly to press the strap partially into the recesses 308 and 310. Furthermore, air is supplied from the manifold 690 to the motor 114 to drive the latter in reverse and thereby rotate the feed roller 78 in the reverse direction to take the slack out of the strap and draw it closely around the package to be bound, the strap being straightened by the rollers 302 and 304 as it passes thereover.

Once the strap has been drawn closely around the package, the air motor 114 will create a back pressure in the reverse manifold 690, thereby increasing the pressure in the manifold and effecting the actuation of the first sequence valve 702. When the valve 702 opens, air is supplied to the upper end of the tension cylinder 64 to move the piston 426 downwardly from the position of FIGURE 10 to the position of FIGURE 9. Such movement of the piston 426 causes the base member 376 to move downwardly on the two vertical guide rods 372 and 374, whereby the gripper 396 grips the strap and pulls it downwardly to apply tension thereto. When the piston 426 reaches the lower end of its operative downstroke, the valve 450 is automatically opened to supply air to the opposite end of the cylinder 64, thereby to raise the piston back to the position of FIGURE 10. When the gripper 396 is thus moved upwardly, it does not grip the strap but merely slides over it, and during such time the holding gripper 430 prevents upward movement of the strap so as to avoid loss of tension therein. The tensioning mechanism continues to reciprocate upwardly and downwardly as many times as is necessary to produce the predetermined desired tension in the strap, and when such tension is produced, the second sequence valve 714 is automatically opened to discontinue the movement of the tensioning mechanism.

When the sequence valve 714 opens, air is supplied to the lower end of the sealing cylinder 76 to raise the piston 500 and piston head or clevis 168. As the clevis 168 moves upwardly between the side plates 164 and 166, the rib 170 on the clevis engages the upper end 160 of the seal feed cam 154 and moves it from the position of FIGURE 14 to the position of FIGURE 16. Such movement of the cam 154 causes the seal feed pawl lever 120 to be actuated forwardly, whereby the feed pawl 128 carried thereon advances the strip 30 of connected seals 32 so as to position the leading seal in an operative position between the side plates 164 and 166 as shown in dotted lines in FIGURE 14. As the clevis 168 continues upwardly, the crimper jaws 550, 552, 554 and 556 take hold of the leading seal 32 as shown in FIGURE 20 and the knife 580 cooperates with the fixed seal cutter 600 to sever the leading seal from the supply strip 30. During such cutting operation, the knife 580 is forced upwardly by the rollers 530 and 540 which engage at the underside of the depending leg members 586 and 588 on the knife.

As the piston 500 continues to move the clevis 168 upwardly, the seal 32 is carried upwardly over the overlapped strap portions between the side plates 164 and 166 substantially as shown in FIGURE 2, and thereafter the crimper jaws 550, 552, 554 and 556 move to fully closed positions as shown in FIGURES 22 and 23 to complete a crimping operation and form a joint of the type illustrated in FIGURE 3, the punched out portions 44 being formed due to the cooperation between the crimper jaws and the punch block 578 which is disposed therebetween. When the crimping operation has been completed, the cross pins 558 and 560 are disposed at the extreme upper ends of the slots 562, 564, 566 and 568 in the side plates 164 and 166, but the knife 580 remains free to move still further upwardly due to the slots 582 and 584 formed therein. Thus, the piston 500 moves further upwardly so as to move the clevis 168 to its extreme upper position as shown in FIGURES 24 and 25, and during such movement the upper end of the clevis carries the knife 580 upwardly. As the knife 580 is thus moved upwardly it cooperates with the fixed strap cutter 202 to cut the lower layer of strap and thereby separate the strap on the bound object from the strap supply.

During the final upward push of the knife 580, the knife presses upwardly on the cut end of the strap to force it up against the upper layer of strap as shown in FIGURE 25, the object being to avoid any projecting sharp edges in the final joint. During the latter operation, the crimper jaws 550, 552, 554 and 556 are opened slightly to avoid load thereon, such opening being effected automatically due to the upward vertical movement of the pins 504 and 506 which pull inwardly on the pin members 512 and 516 to produce a slight rotation of the crimper jaws toward open positions.

When the piston 500 reaches the extreme upper end of its stroke, the reset valve 634 is automatically opened. When the valve 634 opens, the holding pawls 220 and 222 are released, the straightening rollers 302 and 304 are moved downwardly to inoperative positions, the sealing cylinder 76 is actuated to return the piston 500 to its lowermost position, and the tension cylinder 64 is actuated to raise the piston 426 to its uppermost position.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. In an air-operated strapping machine, in combination, feed means for feeding a predetermined length of strap from said machine to be applied to an object to be bound, an air-operated motor for driving said feed means, a first air conduit for supplying air under pressure to said motor for driving the same forwardly to effect the feeding of strap from said machine, first normally closed valve means for opening and closing said first air conduit, a second air conduit for supplying air to said first valve means to maintain the same in open position, and timing means including second bleed-off valve means in said second air conduit for controlling the length of time during which air is supplied to said first valve means through said second air conduit, whereby after a predetermined length of time said first valve means will be closed to discontinue the feeding of strap from said machine.

2. In an air-operated strapping machine, in combination, feed means for feeding a predetermined length of strap from said machine to be applied to an object to be bound, an air-operated motor for driving said feed means, a first air conduit for supplying air under pressure to said motor for driving the same forwardly to effect the feeding of strap from said machine, first normally closed valve means for opening and closing said first air conduit, a second air conduit for supplying air to said first valve means to maintain said first valve means in open position, means for closing off said second air conduit after air under pressure has been supplied thereto to provide a closed pressurized system for maintaining said first valve means open, and second bleed-off valve means disposed in said second air conduit for gradually releasing air pressure from said closed system, said bleed-off valve means being adjustable to control the amount of time during which the pressure in said second conduit is sufficient to maintain said first valve means open, whereby said second bleed-off valve means functions as a timing member to control the amount of strap which is fed from said machine by said feed means.

3. In an air-operated strapping machine, in combination, feed means for feeding a predetermined length of strap from said machine to be applied to an object to be bound, an air-operated motor for driving said feed means, a first air conduit for supplying air under pressure to said motor for driving the same forwardly to effect the feeding of strap from said machine, first normally closed valve means for opening and closing said first air conduit, a second air conduit for supplying air to said first valve means to maintain the same in open position, second normally closed manually operable valve means in said second air conduit for connecting the same to an air supply, whereby said second conduit comprises a closed system which may be charged with air under pressure for maintaining said first valve means open by temporarily manually opening said second valve means, and third bleed-off valve means disposed in said second conduit for gradually releasing air pressure from said closed system, said bleed-off valve means being adjustable to control the amount of time during which the pressure in said second conduit is sufficient to maintain said first valve means open, whereby said bleed-off valve means functions as a timing member to control the amount of strap which is fed from said machine by said feed means.

4. In a strapping machine, in combination, air-operated strap tensioning mechanism adapted to reciprocate through an operative stroke wherein tension is produced in a strap which has been applied to an object to be bound, and a return stroke, air-operated sealing mechanism for applying a seal to the strap after sufficient tension has been produced therein, first air conduit means for supplying air to actuate said tensioning mechanism through its operative stroke, second air conduit means for supplying air to actuate said tensioning mechanism through its return stroke, control means responsive to the position of said tensioning mechanism for controlling the supply of air to said first and second conduits whereby air will be supplied to said first conduit when said tensioning mechanism has completed its return stroke and will be supplied to said second conduit when said tensioning mechanism has completed its operative stroke, sequence valve means for discontinuing the operation of said tensioning mechanism and intiating the operation of said sealing mechanism upon application of a predetermined pressure at said sequence valve means corresponding with a predetermined desired tension in said strap, and means associating said sequence valve means with said first air conduit means so that the pressure developed in the latter will be caused substantially to act on said sequence valve means, whereby said tensioning mechanism will be reciprocated until a predetermined desired tension is produced in said strap, at which time the operation of said sealing mechanism will be initiated.

5. In a strapping machine, in combination, air-operated strap tensioning mechanism adapted to reciprocate through an operative stroke wherein tension is produced in a strap which has been applied to an object to be bound, and a return stroke, air-operated sealing mechanism for applying a seal to the strap after sufficient tension has been produced therein, first air conduit means for supplying air to actuate said tensioning mechanism through its operative stroke, second air conduit means for supplying air to actuate said tensioning mechanism through its return stroke, first valve means common to said first and second air conduits for controlling which one of said conduits receives a supply of air, control means responsive to the position of said tensioning mechanism for controlling said first valve means whereby air will be supplied to said first conduit when said tensioning mechanism has completed its return stroke and will be supplied to said second conduit when said tensioning mechanism has completed its operative stroke, second sequence valve means for discontinuing the operation of said tensioning mechanism and initiating the operation of said sealing mechanism upon application of a predetermined pressure at said sequence valve means corresponding with a predetermined desired tension in said strap, and means associated said sequence valve means with said first air conduit means so that the pressure developed in the latter will be caused substantially to act on said sequence valve means, whereby said tensioning mechanism will be reciprocated until a predetermined desired tension is produced in said strap, at which time the operation of said sealing mechanism will be initiated.

6. In a strapping machine, in combination, air-operated strap tensioning mechanism adapted to reciprocate through an operative stroke wherein tension is produced in a strap which has been applied to an object to be bound, and a return stroke, air-operated sealing mechanism for applying a seal to the strap after sufficient tension has been produced therein, first air conduit means for supplying air to actuate said tensioning mechanism through its operative stroke, second air conduit means for supplying air to actuate said tensioning mechanism through its return stroke, first valve means common to said first and second air conduits for controlling which one of said conduits receives a supply of air, control means responsive to the position of said tensioning mechanism for controlling said first valve means whereby air will be supplied to said first conduit when said tensioning mechanism has completed its return stroke and will be supplied to said second conduit when said tensioning mechanism has completed its operative stroke, third air conduit means for supplying air to actuate said sealing mechanism, second normally closed valve means for controlling the supply of air through said third conduit means, fourth air conduit means for supplying air to said second valve means for opening the same, third normally closed sequence valve means disposed in said fourth air conduit means for effecting the opening of said second valve means and initiating the operation of said sealing mechanism upon application of a predetermined pressure at said sequence valve means corresponding with a predetermined desired tension in said strap, and means connecting said first conduit means with said fourth conduit means through said sequence valve so that the pressure developed in said first conduit means will be caused substantially to act on said sequence valve means and air from said first conduit means will be conducted through said sequence valve when the latter opens, whereby said tensioning mechanism will be reciprocated until a predetermined desired tension is produced in said strap, at which time the operation of said sealing mechanism will be initiated.

7. In a strapping machine, in combination, strap feeding means, a reversible air-operated motor for driving said feeding means forwardly to feed strap from the machine for application to an object to be bound and for subsequently driving said feeding means in reverse to draw the strap closely around the object, air-operated tensioning mechanism adapted to reciprocate through an operative stroke wherein tension is produced in a strap which has been drawn closely around an object to be bound, and a return stroke, air-operated sealing mechanism for applying a seal to the strap after sufficient tension has been produced therein, first air conduit means for supplying air to said air-operated motor for driving the same in reverse and thereby causing said feeding means to draw said strap closely around an object to be bound, first sequence valve means for initiating the operation of said tensioning mechanism upon application of a predetermined pressure at said first sequence valve means in excess of the normal pressure in said first conduit means, means associating said first sequence valve means with said first air conduit means so that the pressure developed in the latter will be caused substantially to act on said first sequence valve means whereby when said strap has been drawn closely around said object the back pressure created by said motor will increase the pressure developed in said first conduit means and effect the opening of said first sequence valve means thereby to initiate the operation of said tensioning means, second air conduit means for supplying air to actuate said tensioning mechanism through its operative stroke, third air conduit means for supplying air to actuate said tensioning mechanism through its return stroke, control means responsive to the position of said tensioning mechanism for controlling the supply of air to said second and third conduits whereby air will be supplied to said second conduit when said tensioning mechanism has completed its return stroke and will be supplied to said third conduit when said tensioning mechanism has completed its operative stroke, second sequence valve means for discontinuing the operation of said tensioning mechanism and initiating the operation of said sealing mechanism upon application of a predetermined pressure at said second sequence valve means corresponding with a predetermined desired tension in said strap, and means associating said second sequence valve means with said second air conduit means so that the pressure developed in the latter will be caused substantially to act on said second sequence valve means, whereby said tensioning mechanism will be reciprocated until a predetermined desired tension is produced in said strap, at which time the operation of said sealing mechanism will be initiated.

8. In a strapping machine of the type wherein a predetermined length of strap is fed from the machine for application to an object to be bound and is then drawn closely around the object, tensioning mechanism for producing additional tension in the strap comprising, in combination, first strap gripping means, actuating means for reciprocating said first gripping means through an operative stroke wherein the strap is pulled by said first gripping means in reverse direction through the machine and a return stroke wherein said first gripping means is moved back relative to the strap approximately to its original position, and second gripping means for holding the strap to maintain the tension therein during the return stroke of said first gripping means.

9. In a strapping machine of the type wherein a predetermined length of strap is fed from the machine for application to an object to be bound and is then drawn closely around the object, tensioning mechinism for producing additional tension in the strap comprising, in combination, first strap gripping means, actuating means for reciprocating said first gripping means through an operative stroke wherein the strap is pulled by said first gripping means in reverse direction through the machine and a return stroke wherein said first gripping means is moved back relative to the strap approximately to its original position, second gripping means for holding the strap to maintain the tension therein during the return stroke of said first gripping means, means for controlling said actuating means to effect continuous reciprocation of said first gripping means until a predetermined desired strap tension is produced, and means for discontinuing the reciprocation of said first gripping means when said predetermined tension is produced.

10. In a strapping machine of the type wherein a predetermined length of strap is fed from the machine for application to an object to be bound and is then drawn closely around the object, tensioning mechanism for producing additional tension in the strap comprising, in combination, first strap gripping means, actuating means for reciprocating said first gripping means through an operative stroke wherein the strap is pulled by said first gripping means in reverse direction through the machine and a return stroke wherein said first gripping means is moved back relative to the strap approximately to its original position, second gripping means for holding the strap to maintain the tension therein during the return stroke of said first gripping means, and means for actuating both said first and second gripping means to released positions when said first gripping means is disposed in said original position.

11. In a strapping machine of the type wherein a predetermined length of strap is fed from the machine for application to an object to be bound and is then drawn closely around the object, tensioning mechanism for producing additional tension in the strap comprising, in combination, first strap gripping means, actuating means for reciprocating said first gripping means through an operative stroke wherein the strap is pulled by said first gripping means in reverse direction through the machine and a return stroke wherein said first gripping means is moved back relative to the strap approximately to its original position, second gripping means for holding the strap to maintain the tension therein during the return stroke of said first gripping means, means for controlling said actuating means to effect continuous reciprocation of said first gripping means until a predetermined desired strap tension is produced, means for discontinuing the reciprocation of said first gripping means when said predetermined tension is produced, means for biasing said second gripping means to an operative position for gripping the strap, and release means for actuating both said first and second gripping means to released positions when said first gripping means is disposed in said original position, said release means including abutting means carried with said first gripping means and engageable with said second gripping means for moving the latter to a released position when said first gripping means is disposed in said original position.

12. In a strapping machine of the type wherein a predetermined length of strap is fed from the machine for application to an object to be bound and is then drawn closely around the object, tensioning mechanism for producing additional tension in the strap comprising, in combination, first strap gripping means including a base member and a gripper member between which said strap is disposed, said gripper member being carried by said base member and being movable toward and away from said base member between operative and inoperative positions, means for biasing said gripper member toward said base member to its operative position, actuating means for reciprocating said first gripping means through an operative stroke wherein the strap is pulled by said first gripping means in reverse direction through the machine and a return stroke wherein said first gripping means is moved back relative to the strap approximately to its original position, and second gripping means for holding the strap to maintain the tension therein during the return stroke of said first gripping means.

13. In a strapping machine of the type wherein a predetermined length of strap is fed from the machine for application to an object to be bound and is then drawn closely around the object, tensioning mechanism for producing additional tension in the strap comprising, in combination, first strap gripping means including a base member and a gripper member between which said strap is disposed, said gripper member being carried on said base member by a plurality of parallel links to provide a parallelogram structure whereby said gripper is movable toward and away from said base member between operative and inoperative positions while remaining substantially parallel to said base member, means for biasing said gripper member toward said base member to its operative position, actuating means for reciprocating said first gripping means through an operative stroke wherein the strap is pulled by said first gripping means in reverse direction through the machine and a return stroke wherein said first gripping means is moved back relative to the strap approximately to its original position, and second gripping means for holding the strap to maintain the tension therein during the return stroke of said first gripping means.

14. In a strapping machine of the type wherein a predetermined length of strap is fed from the machine for application to an object to be bound and is then drawn closely around the object, tensioning mechanism for producing additional tension in the strap comprising, in combination, first strap gripping means including a base member and a gripper member between which said strap is disposed, said gripper member being carried on said base member by a plurality of parallel links to provide a parallelogram structure whereby said gripper is movable toward and away from said base member between operative and inoperative positions while remaining substantially parallel to said base member, means for biasing said gripper member toward said base member to its operative position, actuating means for reciprocating said first gripping means through an operative stroke wherein the strap is pulled by said first gripping means in reverse direction through the machine and a return stroke wherein said first gripping means is moved back relative to the strap approximately to its original position, second gripping means for holding the strap to maintain the tension therein during the return stroke of said first gripping means, means for controlling said actuating means to effect continuous reciprocation of said first gripping means until a predetermined desired strap tension is produced, and means for discontinuing the reciprocation of said first gripping means when said predetermined tension is produced.

15. In a strapping machine of the type wherein a predetermined length of strap is fed from the machine for application to an object to be bound and is then drawn closely around the object, tensioning mechanism for producing additional tension in the strap comprising, in combination, first strap gripping means including a base member and a gripper member between which said strap is disposed, said gripper member being carried on said base member by a plurality of parallel links to provide a parallelogram structure whereby said gripper is movable toward and away from said base member between operative and inoperative positions while remaining substantially parallel to said base member, means for biasing said gripper member toward said base member to its operative position, actuating means for reciprocating said first gripping means through an operative stroke wherein the strap is pulled by said first gripping means in reverse direction through the machine and a return stroke wherein said first gripping means is moved back relative to the strap approximately to its original position, second gripping means for holding the strap to maintain the tension therein during the return stroke of said first gripping means, means for controlling said actuating means to effect continuous reciprocation of said first gripping means until a predetermined desired strap tension is produced, means for discontinuing the reciprocation of said first gripping means when said predetermined tension is produced, means for biasing said second gripping means to an operative position for gripping the strap, and release means for actuating both said first and second gripping means to released positions when said first gripping means is disposed in said original position, said release means including abutting means carried with said first gripping means and engageable with said second gripping means for moving the latter to a released position when said first gripping means is disposed in said original position.

16. In a strapping machine having strap feeding means, drive means for driving the feeding means forwardly to feed strap forwardly from the machine for application to an object to be bound and for subsequently driving the feeding means in reverse to move the strap in a reverse direction and draw it closely around the object, the improvement comprising, in combination, strap straightening means positioned to act on the strap at a location which the strap passes before it leaves the machine, said straightening means normally being in an inoperative position as when the strap is being fed forwardly therepast, and means for moving said straightening means to an operative position in engagement with the strap when said strap is being driven in reverse to draw it closely around the object.

17. In a strapping machine having strap feeding means, drive means for driving the feeding means forwardly to feed strap forwardly from the machine for application to an object to be bound and for subsequently driving the feeding means in reverse to move the strap in a reverse direction and draw it closely around the object, the improvement comprising, in combination, strap straightening means including a fixed guide member and a movable member for pressing the strap against said guide member to straighten the strap, said straightening means being positioned to act on the strap at a location which the strap passes before it leaves the machine, said movable member being spaced from said guide member in an inoperative position when the strap is being fed forwardly therepast, and means for moving said movable member toward said guide member to an operative position when said strap is being driven in reverse to draw it closely around the object.

18. In a strapping machine, in combination, strap feeding means, drive means for driving the feeding means forwardly to feed strap forwardly from the machine for application to an object to be bound and for subsequently driving the feeding means in reverse to move the strap in a reverse direction and draw it closely around the object, strap straightening means positioned to act on the strap at a location which the strap passes before it leaves the machine, said straightening means normally being in an inoperative position as when the strap is being fed forwardly therepast, and actuating means for actuating said drive means in reverse direction and for substantially simultaneously moving said straightening means to an operative position in engagement with said strap.

19. In a strapping machine, in combination, strap feeding means, drive means for driving the feeding means forwardly to feed strap forwardly from the machine for application to an object to be bound and for subsequently driving the feeding means in reverse to move the strap in a reverse direction and draw it closely around the object, strap straightening means including a fixed guide member and a movable member for pressing the strap against said guide member to straighten the strap, said straightening means being positioned to act on the strap at a location which the strap passes before it leaves the machine, said movable member being spaced from said guide member in an inoperative position when the strap is being fed forwardly therepast, and actuating means for actuating said drive means in reverse direction and for substantially simultaneously moving said movable member toward said guide member to an operative position in engagement with said strap.

20. In a strapping machine, in combination, strap feeding means, drive means for driving the feeding means forwardly to feed strap forwardly from the machine for application to an object to be bound and for subsequently driving the feeding means in reverse to move the strap in a reverse direction and draw it closely around the object, strap straightening means including a fixed guide member, a movable retainer, and roller means carried on said retainer for pressing the strap against said guide member to straighten the strap, said straightening means being positioned to act on the strap at a location which the strap passes before it leaves the machine, said movable retainer and roller means being spaced from said guide member in an inoperative position when the strap is being fed forwardly therepast, and actuating means for actuating said drive means in reverse direction and for substantially simultaneously moving said retainer and roller means toward said guide member to an operative position in engagement with said strap.

21. In a strapping machine, feed means for feeding a supply of strap through the machine, comprising, in combination, a rotatable feed roller having a first serrated cylindrical drive portion for engaging and feeding strap and a second feed roller portion axially adjacent thereto, a back-up roller disposed adjacent said feed roller and having a first cylindrical back-up roller portion in alignment with said serrated drive portion, spring means for biasing said back-up roller toward said feed roller to press strap disposed therebetween against said serrated drive portion, and a second back-up roller portion for engagment with said second feed roller portion when no strap is disposed therebetween for maintaining said serrated drive portion in spaced relation to said first back-up roller portion.

22. In a strapping machine, feed means for feeding a supply of strap through the machine, comprising, in combination, a rotatable feed roller having a first operative cylindrical feed roller portion for engaging and feeding strap and a second axially adjacent cylindrical feed roller portion of lesser diameter than said first feed roller portion, a back-up roller disposed adjacent said feed roller, said back-up roller having a first cylindrical back-up roller portion in alignment with said first feed roller portion for pressing strap against said first feed roller portion, and a second axially adjacent cylindrical back-up roller portion of greater diameter than said first back-up roller portion and in alignment with said second feed roller portion, and spring means for biasing said backup-roller against said feed roller, the combined radii of said second feed roller portion and said second back-up roller portion being in excess of the combined radii of said first feed roller portion and said first back-up roller portion by an amount less than the thickness of said strap, whereby when strap is disposed therebetween said first back-up roller portion will press said strap against said first feed roller portion, and when no strap is disposed between said feed roller and said back-up roller said second back-up roller portion will engage against said second feed roller portion and maintain a space between said first feed roller portion and said first back-up roller portion.

23. In a strapping machine having strap feeding means and drive means for driving the feeding means forwardly to feed strap from the machine for application to an object to be bound and for subsequently driving the feeding means in reverse to draw the strap closely around the object, the improvement comprising, in combination, a fixed strap cutter member over which a free end of the strap is positioned prior to driving said feeding means in reverse, a pivotally mounted strap holding member having a finger portion which extends generally transversely to the strap and overlies the free end of the strap proximate the area where the strap extends over said fixed cutter, and means for pivoting said holding member to cause said finger portion to press said free end of said strap against said fixed cutter thereby to hold said free end of said strap while said feeding means is driven in reverse to draw the strap closely around the object.

24. In a strapping machine, in combination, strap feeding means, drive means for driving the feeding means forwardly to feed strap from the machine for application to an object to be bound and for substantially driving the feed means in reverse to draw the strap closely around the object, a fixed strap cutter member over which a free end of the strap is positioned prior to driving said feeding means in reverse, a pair of oppositely disposed pivotally mounted strap holding members each having a finger portion which extends generally transversely to the strap and overlies a corresponding side portion of the free end of the strap proximate the area where the strap extends over said fixed cutter, and actuating means for initiating the driving of said feeding means in reverse and for substantially simultaneously effecting the pivoting of said pair of holding members to cause said oppositely disposed finger portions to press said free end of said strap against said fixed cutter thereby to hold said free end of said strap while said feeding means is driven in reverse to draw the strap closely around the object.

25. In a strapping machine, seal feeding mechanism for feeding a seal supply of the type comprising a strip of integrally connected seals, said mechanism comprising, in combination, a pivotally mounted seal feed lever having pawl means thereon for feeding said strip of seals forwardly to position the leading seal in an operative position for a sealing operation, sealing mechanism including a piston head member which is movable through an operative stroke during a sealing operation, and a pivotally mounted actuating lever associated with said seal feed lever for actuating the latter through a forward operative stroke, said actuating lever being normally disposed in the path of said piston head member for engagement by the latter, whereby when said piston head member begins its movement to initiate a sealing operation it will engage and pivot said actuating lever and thereby cause the leading seal to be fed into operative position by said seal feed lever.

References Cited by the Examiner
UNITED STATES PATENTS

| | | | |
|---|---|---|---|
| 1,805,791 | 5/31 | Treat | 100—10 |
| 2,646,102 | 7/53 | Friedman | 140—147 X |
| 2,707,430 | 5/55 | Leslie et al. | 100—30 X |
| 2,880,666 | 4/59 | Rogers | 100—26 |
| 3,012,497 | 12/61 | Fryer | 100—31 X |
| 3,057,289 | 10/62 | Luthi | 100—32 X |
| 3,066,599 | 12/62 | Koehler | 100—30 X |
| 3,086,451 | 4/63 | Van Derwal | 100—26 |
| 3,101,663 | 8/63 | Hall et al. | 100—30 |
| 3,116,681 | 1/64 | Van De Bilt | 100—26 |
| 3,120,171 | 2/64 | Hall et al. | 100—26 |
| 3,139,813 | 7/64 | Hall et al. | 100—4 |
| 3,146,695 | 9/64 | Van De Bilt | 100—4 |
| 3,157,109 | 11/64 | Flanigan et al. | 100—31 X |

WALTER A. SCHEEL, *Primary Examiner.*

BILLY J. WILHITE, *Examiner.*